United States Patent
Luo et al.

(10) Patent No.: US 7,155,434 B1
(45) Date of Patent: Dec. 26, 2006

(54) LOCKING MECHANISM EMPLOYING A NAME LOCK FOR MATERIALIZED VIEWS

(75) Inventors: Gang Luo, Madison, WI (US); Curt J. Ellmann, Madison, WI (US); Jeffrey F. Naughton, Madison, WI (US); Michael W. Watzke, Madison, WI (US)

(73) Assignee: NCR Corp., Dayton, OH (US)

( * ) Notice: Subject to any disclaimer, the term of this patent is extended or adjusted under 35 U.S.C. 154(b) by 263 days.

(21) Appl. No.: 10/117,503

(22) Filed: Apr. 4, 2002

(51) Int. Cl.
*G06F 17/30* (2006.01)
*G06F 7/00* (2006.01)

(52) U.S. Cl. ............... 707/8; 707/9; 707/100; 707/200

(58) Field of Classification Search .............. 707/8, 707/100, 203, 2, 200, 9; 717/140
See application file for complete search history.

(56) References Cited

U.S. PATENT DOCUMENTS

| | | | | |
|---|---|---|---|---|
| 5,261,069 A | * | 11/1993 | Wilkinson et al. | 711/145 |
| 5,581,750 A | * | 12/1996 | Haderle et al. | 707/202 |
| 5,983,215 A | * | 11/1999 | Ross et al. | 707/2 |
| 6,353,828 B1 | * | 3/2002 | Ganesh et al. | 707/8 |
| 6,353,835 B1 | * | 3/2002 | Lieuwen | 707/203 |
| 6,581,205 B1 | * | 6/2003 | Cochrane et al. | 717/140 |
| 6,668,295 B1 | * | 12/2003 | Chan | 710/200 |
| 6,687,709 B1 | * | 2/2004 | Williams | 707/103 R |
| 6,708,195 B1 | * | 3/2004 | Borman et al. | 718/102 |
| 6,754,656 B1 | * | 6/2004 | Cornwell et al. | 707/8 |

OTHER PUBLICATIONS

Oracle9i Data Warehousing Guide, Release 9.0.1, Jun. 2001, Oracle.*
Rick Grehan, "How to Climb a B-tree: B-tree, a popular tree-indexing structure, is perfect for db4o database system, and can save you a lot of disk access time," printed from http://www.fawcette.com, 25 pages (dated as early as Jan. 8, 2003).
Kevin Jones, "TPFDF B+Tree Indexing Support," printed from http://www-3.ibm.com, pp. 1-3 (dated as early as Jan. 8, 2003).
SAP Library-User Manual: SAP DB, "B*Tree," printed from http://pipin.tmd.ns.ac.yu, pp. 1-2 (dated as early as Jan. 8, 2003).
Gang Luo et al., "Locking Protocols for Materialized Aggregate Join Views," pp. 1-11 (Jun. 2003).
B.R. Badrinath et al, "Semantics-Based Concurrency Control: Beyond Cummutativity," TODS pp. 163-199 (1992).

(Continued)

*Primary Examiner*—Greta Robinson
*Assistant Examiner*—Kuen S. Lu
(74) *Attorney, Agent, or Firm*—Trop. Pruner & Hu; Charlie Maney

(57) ABSTRACT

A database system includes a locking mechanism for a materialized view defined on base relations. In response to updates of a base relation, a name lock is placed on the materialized view. The name lock is a type of exclusive lock and is associated with a data structure containing a first parameter to identify a base relation of the materialized view being updated, and a second parameter to indicate a number of transactions updating the base relation. With locking mechanisms according to some embodiments of the invention, transaction concurrency is enhanced by enabling concurrent updates of a materialized view by plural transactions in certain cases.

28 Claims, 20 Drawing Sheets

OTHER PUBLICATIONS

J. Gray et al., "Granularity of Locks and Degrees of Consistency in a Shared Data Base," IFIP Working Conference on Modeling in Data Base Management Systems, pp. 365-394 (1976).

J. Gray et al., "Transaction Processing: Concepts and Techniques," Morgan Kaufmann Publishers, pp. 403-406, 409-411, 413, 414, 419, 428, 429, 456-458, 464-481, 848-851, 868-872 (1993).

A. Kawaguchi et al., "Concurrency Control Theory for Deferred Materialized Views," ICDT pp. 306-320 (1997).

H.F. Korth, "Locking Primitives in a Database System," JACM pp. 55-79 (1983).

W. Labio et al., "Performance Issues in Incremental Warehouse Maintenance," VLDB pp. 461-472 (2000).

P.E. O'Neil, "The Escrow Transactional Method," TODS pp. 405-430 (1986).

M. Poess et al. "New TPC Benchmarks for Decision Support and Web Commerce," SIGMOD pp. 64-71 (2000).

R.F. Resende et al., "Semantic Locking in Object-Oriented Database Systems," OOPSLA, pp. 388-402 (1994).

A. Reuter, "Concurrency on High-traffic Data Elements," PODS, pp. 83-92 (1982).

Gang Luo et al., U.S. Appl. No. 10/121,190, entitled "Rescheduling Transactions in a Database System," filed Apr. 12, 2002, pp. 1-80, Figs. 1-33.

Gang Luo et al., U.S. Appl. No. 10/121,191, entitled "Transaction Grouping and Rescheduling in a Database System," filed Apr. 12, 2002, pp. 1-80, Figs. 1-33.

M. Kornacker et al, "Concurrency and Recovery in Generalized Search Trees," SIGMOD pp. 62-72 (1997).

D.B. Lomet, "Key Range Locking Strategies for Improved Concurrency," VLDB pp. 655-644 (1993).

C. Mohan, "A Key-Value Locking Method for Concurrency Control of Multiaction Transactions Operating on B-Tree Indexes," VLDB, pp. 392-405 (1990).

C. Mohan, "Commit_LSN: A Novel and Simple Method for Reducing Locking and Latching in Transaction Processing Systems," VLDB pp. 406-418 (1990).

\* cited by examiner

FIG. 4C

|  | AJV | | virtual JV | |
|---|---|---|---|---|
| initial: | A.a | SUM(b.d) | A.a | B.d |
|  | 1 | 3 | 1 | 3 |

|  | AJV | | virtual JV | |
|---|---|---|---|---|
| insert (1,1), (1,5) | A.a | SUM(b.d) | A.a | B.d |
|  | 1 | 9 | 1 | 3 |
|  |  |  | 1 | 1 |
|  |  |  | 1 | 5 |

LOCKING MECHANISM EMPLOYING A NAME LOCK FOR MATERIALIZED VIEWS

CROSS REFERENCE TO RELATED APPLICATIONS

This is related to U.S. application Ser. No. 10/117,497, entitled "Locking Mechanism Using a Predefined Lock for Materialized Views in a Database System"; and U.S. application Ser. No. 10/117,165, entitled "Locking Mechanism for a Materialized View that Does Not Employ Locks on the Materialized View" filed Apr. 4, 2002 concurrently herewith by Gang Luo, Michael W. Watzke, Curt J. Ellmarm, and Jeffrey F. Naughton.

BACKGROUND

A database is a collection of stored data that is logically related and that is accessible by one or more users. A popular type of database is the relational database management system (RDBMS), which includes relational tables made up of rows and columns. Each row represents an occurrence of an entity defined by a table, with an entity being a person, place, or thing about which the table contains information. To extract data from, or to update, a relational table, queries according to a standard database query language (e.g., Structured Query Language or SQL) are used. A table (also referred to as a relation) is made up of multiple rows (also referred to as tuples). Each row (or tuple) includes multiple columns (or attributes).

Various other data structures are also typically associated with relations in a relational database system. For example, a view is a derived relation formed by performing a function on one or more base relations. Rather than storing the view, the function is typically recomputed each time the view is referenced. This type of view is referred to as an "ordinary view."

Unlike an ordinary view, a materialized view is a precomputed, stored query result that can be used for some queries instead of reconstructing the results directly from the base relations. As with the ordinary view, a function is performed on the base relations to derive the materialized view. However, because the materialized view is stored, fast access to the data is possible without recomputing the view.

After the materialized view is created, subsequent queries are able to use the materialized view, where appropriate, to increase query processing speed. Materialized views can be used to assemble data that come from many different relations. One type of view is the join view, which stores join results of multiple base relations.

A materialized view is updated when the underlying base relations are modified. As the base relations are changed through insertion of new tuples, deletion of tuples, or updates to existing tuples, the corresponding rows in the materialized view are changed to avoid becoming stale. This is known as materialized view maintenance.

Relational database systems can be used for data warehouse applications. A data warehouse collects information from several source databases. The collected information is integrated into a single database to be queried by the data warehouse clients.

Traditionally, data warehouses have been archival stores used for analysis of historical data. More recently, however, there has been a growing trend to use a data warehouse operationally (referred to as a "operational data warehouse" or "real-time data warehouse"), which involves making relatively real-time decisions about data stored in the data warehouse.

Traditional techniques of maintaining views are usually inadequate (in terms of processing speed) for operational data warehouses due to the real-time update requirements. Furthermore, materialized view maintenance in an operational data warehouse requires transactional consistency. If transactional consistency is enforced by traditional concurrency control mechanisms (including locking mechanisms), the ability of the database system to perform concurrent transactions may be reduced. This hurts performance in a database system, especially in a parallel database system having multiple processing modules.

When a base relation is updated (e.g., new row inserted, existing row deleted, or row modified), the update needs to be propagated to a materialized view as part of the materialized view maintenance. In some systems, to increase operational speeds, reduced levels of consistency are used that allow "dirty reads," which are reads of stale data in relations. However, when such reduced levels of consistency are used in an environment in which materialized views are present, inconsistent query results are often obtained as a result of inaccurate data being captured in materialized views.

SUMMARY

In general, a method and apparatus are provided to improve concurrency control in a database system in which materialized views are maintained. For example, a method of maintaining consistency in a database system storing a materialized view that is based on base relations includes receiving a first transaction to update a first one of the base relations. If no conflicting locks have been placed on the view, a name lock is placed on the view, with the name lock identifying the first base relation.

Other or alternative features will become more apparent from the following description, from the drawings, and from the claims.

BRIEF DESCRIPTION OF THE DRAWINGS

FIGS. 4A–4C illustrate example join views based on multiple base relations with projection or aggregation applied.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

I. Introduction

In accordance with some embodiments of the invention, a locking mechanism for materialized views (such as join views) is provided in a relational database system. A common form of materialized view is the join view, which is a view that stores and maintains the result of a join of multiple base relations (also referred to as "base tables"). However, locking mechanisms described here can be extended to other types of views.

The following provides an example query for creating a join view (JV) on two base relations (A, B):

CREATE JOIN VIEW JV AS
SELECT *
FROM A, B
WHERE A.c=B.d
PARTITIONED ON A.e;

The join view JV includes tuples (also referred to as "rows") of base relations A and B where the attributes (also referred to as "columns") A.c and B.d are equal. The join view JV is partitioned on the attribute A.e. In other examples, a join view can be stored for a join of more than two base relations. In the following description, the terms "table" and "relation" are used interchangeably. Also, a table or relation has rows (or tuples) and columns (or attributes). The terms "rows" and "tuple" are used interchangeably, and the terms "column" and "attribute" are used interchangeably.

Figure 1:
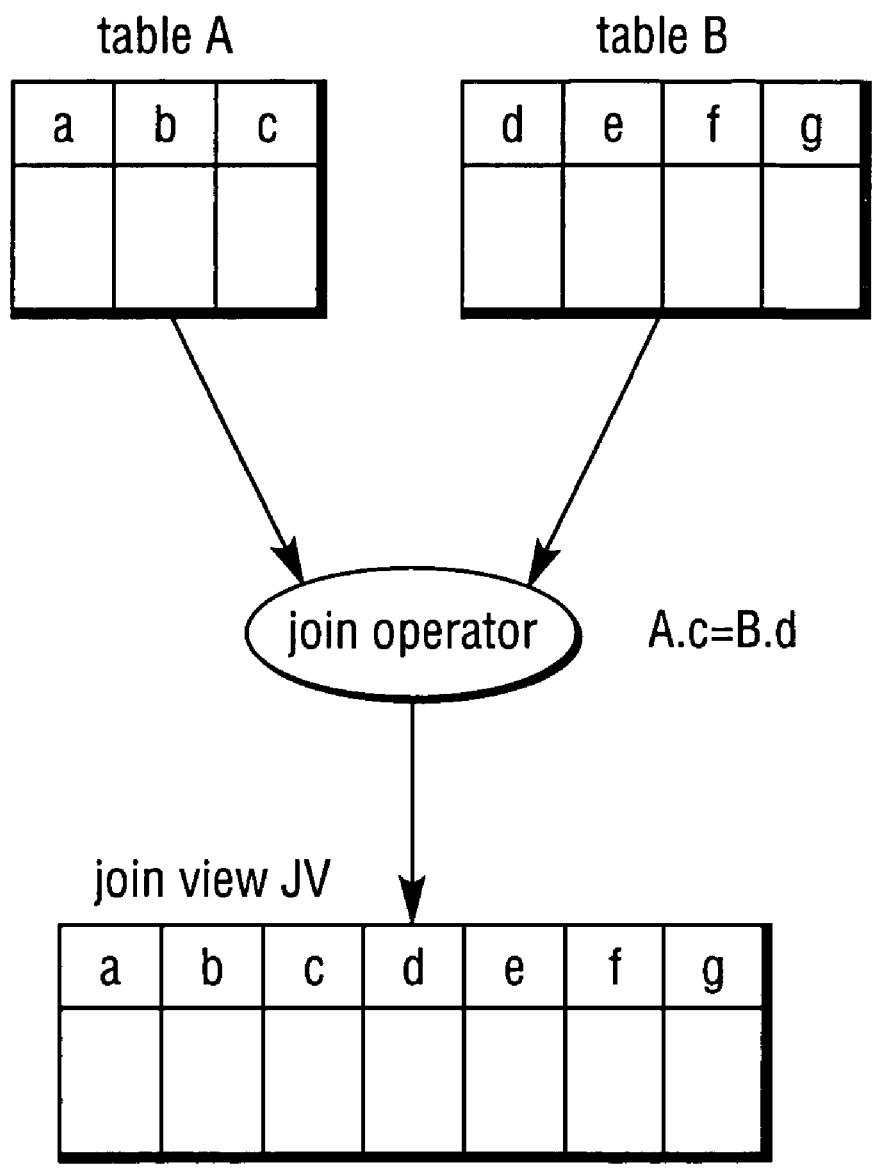
FIG. 1 illustrates an example join view based on multiple base relations.

The join relations A and B and the join view JV created as a result of the query is shown in FIG. 1. Relation A has attributes a, b, c, and relation B has attributes d, e, f, g. The "SELECT *" clause selects all attributes of relations A and B for insertion into the join view JV (which contains attributes a, b, c, d, e, f, g). Note that less than all attributes of relations A and B can be projected into the join view JV, in which case less than all of the attributes a, b, c, d, e, f, g, are stored in the join view JV.

There are various different types of locks that can be placed on data stored in relational tables to restrict access to or the ability to modify the data. Table-level locks are placed on an entire table or relation. Table-level locks include a table-level shared (S) lock and a table-level exclusive (X) lock. Generally, once placed on a table, a table-level S lock blocks a subsequent transaction that attempts to write to any part of the table. A table-level X lock placed on a table is more restrictive, as it blocks any subsequent transaction that attempts to read from or write to any part of the table.

While a table-level locking mechanism locks an entire table, a value locking mechanism locks only a portion of the table. The value locking mechanism specifies a value (or values) of an attribute(s) in a table for which locks are to be placed. Such an attribute, or attributes, is referred to as a value locking attribute, or value locking attributes. A value locking mechanism usually locks only one row or a few rows.

Value locks include a shared (S) value lock and an exclusive (X) value lock. To place an X value lock on an attribute value of a base relation R, a table-level intention exclusive (IX) lock is first placed on R. Similarly, to place an S value lock on an attribute value of the base relation R, a table-level intention shared (IS) lock is first placed on R.

A table-level IX lock is placed on a relation to prevent any subsequent table-level X or S locks on the same relation. The IX lock is a mechanism for the database system to efficiently determine whether a subsequent table-level X or S lock can be placed, without having to find out if there is a conflicting value lock on the relation. For example, suppose the value locking attribute of a relation R is attribute R.a. There can potentially be multiple value locks placed on multiple values of R.a. Thus, a first X value lock can be placed on row(s) of the relation R with R.a=5, a second X value lock can be placed on row(s) of relation R with R.a=2, and so forth. If a subsequent transaction attempts to read the entire relation R, the subsequent transaction will need to acquire a table-level S lock. One way to determine if the table-level lock S lock can be granted is by finding each R.a value for which there is an X value lock. However, this is inefficient. Instead, according to some embodiments, a table-level IX lock is placed on the relation R if there is at least one X value lock on the base relation R. Thus, to determine if the table-level S lock can be placed on the relation R, the database system can quickly detect that there is already an IX lock placed on the relation R, which blocks acquisition of the table-level S lock. Note that only one IX lock is needed for multiple X value locks of a relation. The IX lock also blocks any subsequent table-level X lock.

Similarly, a table-level IS lock placed on a relation R for an S value lock blocks any subsequent table-level X lock.

If a transaction T attempts to update base relation R, the transaction has two choices: (1) T can place a table-level X lock on base relation R; or (2) T can place an IX lock on R and an X value lock on some value locking attribute of R. Similarly, if transaction T attempts to read base relation R, transaction T also has two choices: (1) T can place a table-level S lock on R; or (2) T can place an IS lock on R and an S value lock on some value locking attribute of R.

If materialized views are also stored in the database system, a locking mechanism is also provided for the materialized view. In one embodiment, a "Y-lock" locking mechanism is provided for the materialized view. In another embodiment, a "no-lock" locking mechanism is provided for the materialized view. In yet another embodiment, a "name-lock" locking mechanism is provided for the materialized view.

II. Example Database System Arrangement

Figure 2:
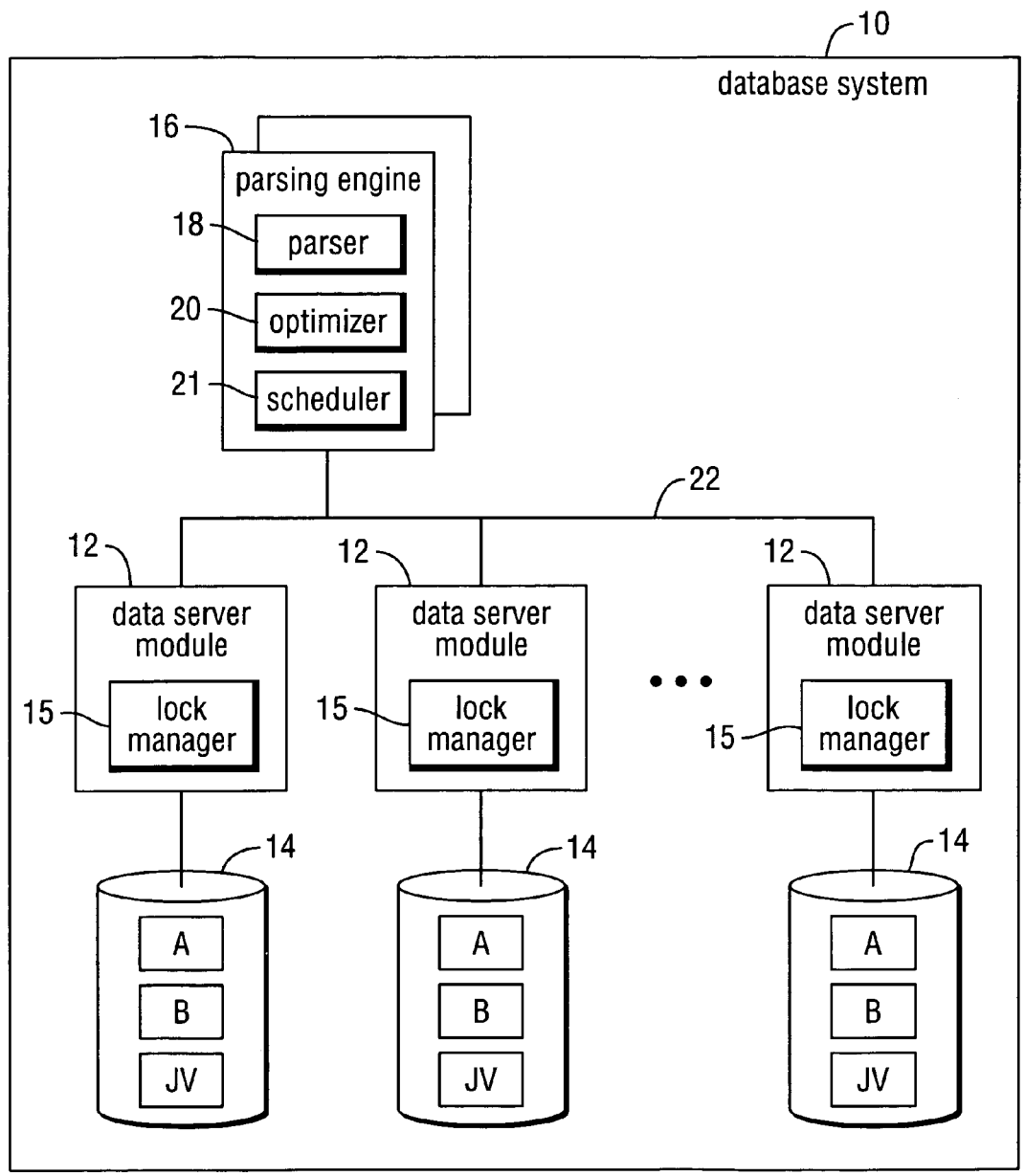
FIG. 2 is a block diagram of an example arrangement of a database system.

FIG. 2 shows an example arrangement of a database system 10 that stores base relations (e.g., A, B) and join views (e.g., JV). The database system 10 is a parallel database system having a plurality of data server modules 12. Each data server module 12 is responsible for managing the access to or modification of data stored in a respective storage module 14. Examples of the responsibilities of each data server module (also referred to as "an access module") include locking databases, tables, or portions of tables; creating, modifying, or deleting definitions of tables; inserting, deleting, or modifying rows within tables; and retrieving information from definitions and tables. The data server modules, after executing an action, also return responses to a requesting client. In one example implementation, the data server modules 12 are based on access module processors (AMPs) in TERADATA™ database systems from NCR Corporation.

According to one embodiment, each data server module 12 includes a lock manager 15 to provide a locking mechanism according to some embodiments of the invention. Thus, the lock manager 15 is responsible for placing locks (e.g. table-level locks or value locks) on base relations and join views. As shown, the locking mechanism is distributed across plural data server modules 12. Alternatively, a centralized lock manager is employed.

In one embodiment, the requesting client that sends commands to the data server modules 12 include one or more parsing engines 16. The parsing engine(s) 16 receive requests from users or applications, which are in the form of queries according to a standard database query language (such as a Structured Query Language or SQL, as provided by the American National Standards Institute or ANSI). In other embodiments, other types of database query languages can be used.

Each parsing engine 16 includes a parser 18 and an optimizer 20. The parser 18 checks a received request for proper syntax and semantically evaluates the request. The optimizer 20 develops an execution plan for the received request. In some embodiments, the optimizer 20 uses a cost-based mechanism to select a least expensive (in terms of system resources utilized) execution plan for the query.

The execution plan includes a series of "steps" that are communicated to one or more of the data server modules 12 over a communications network 22. If the execution plan can be executed by one data server module 12, then the parsing engine 16 sends the one or more steps of the execution plan to the one data server module 12. However, if plural data server modules 12 are involved in the execution plan, the parsing engine 16 sends the step(s) to the plural data server modules 12. The sequence in which steps of an execution plan are executed is controlled by a scheduler 21 in the parsing engine 16.

In the example shown in FIG. 2, base relations A and B are stored in plural storage modules 14 associated with corresponding data server modules 12. Each base relation A or B is partitioned into plural partitions based on one or more selected attributes (referred to as the primary index) of the base relation. Each partition stored on a respective storage module 14 includes a subset of all the rows of the base relation. A join view (JV), such as a join view based on a join of tables A and B, is also partitioned across the plurality of storage modules 14. In the example join view CREATE statement above, the join view is partitioned on attribute A.e of base relation A. Thus, a first partition of the join view JV is stored on a first storage module 14 based on some value(s) of A.e; a second partition of JV is stored on a second storage module 14 base on some other value(s) of A.e; and so forth.

Although the storage modules 14 are shown as separate modules, they can be part of the same storage subsystem. Alternatively, the storage modules 14 can be separate storage devices. In another embodiment, instead of plural data server modules 12, the database system 10 can include only one data server module 12. The locking mechanism according to the various embodiments can be applied to a single-data server module database system rather than the multiple-data server module database system shown in FIG. 2.

III. Y-Lock Locking Mechanism

In accordance with one embodiment of the invention, the locking mechanism provided for the join view is a "Y-lock" locking mechanism. A Y lock has similar functionality as an X lock, with the major difference being that the Y lock does not conflict with itself. In other words, the Y lock is a modified type of exclusive lock placed on a join view that allows subsequent Y locks to be placed on the same join view even though a first Y lock is still active on the join view. In contrast, a table-level X lock placed on a join view blocks a subsequent X lock on the same join view. By enabling multiple Y locks to be concurrently placed on the same join view, throughput of transactions in the database system 10 can be greatly increased, as the possibility of lock conflicts on the join views among different transactions is reduced. A Y lock is also referred to as a "modified-exclusive" lock.

Figure 3:
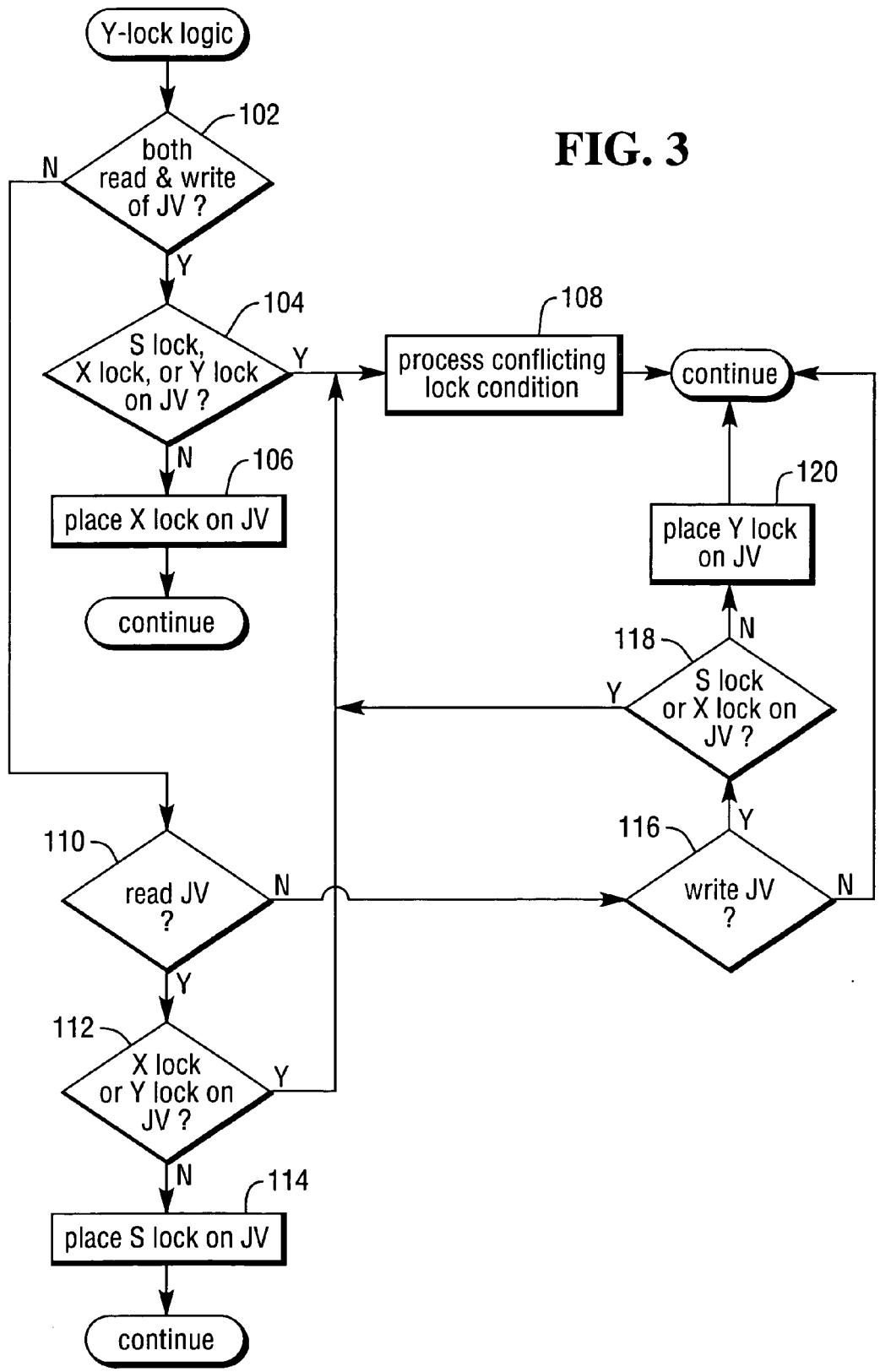
FIG. 3 is a flow diagram of logic for a Y-lock locking mechanism according to one embodiment for join view maintenance.

Three types of table-level locks are allowed on a join view (JV): Y locks, S locks, and X locks. The conditions under which such table-level locks are allowed are shown by the logic of FIG. 3. The logic shown in FIG. 3 is performed by a data server module 12 in the database system 10 of FIG. 2. If more than one data server module 12 is involved in a particular transaction, then each data server module 12 performs the acts of FIG. 3 concurrently.

Upon receiving steps associated with a transaction, the data server module 12 first determines (at 102) if the transaction specifies both a read and write of the join view JV. As used here, writing a view is also referred to as updating or modifying the view. If the transaction specifies both a read and write of JV, then the data server module 12 determines (at 104) if an S lock, X lock, or Y lock is currently active on the join view JV. If none of an S lock, X lock, or Y lock is active on the join view JV, the data server module 12 places (at 106) an X lock on the join view JV. Note that the X lock required for the received transaction conflicts with any of an X lock, S lock, or Y lock, so that the presence of any such table-level lock on JV blocks the required X lock for the received transaction.

If the data server module 12 determines (at 104) that any of the S lock, X lock, or Y lock is active on JV, the data server module 12 performs (at 108) conflicting lock processing. For example, the data server module 12 can wait until the current conflicting lock has been released. Different embodiments perform different tasks in response to detecting that a received transaction cannot proceed because of conflicting locks placed on the join view JV.

If the transaction is determined not to involve both a read and write of the join view JV (at 102), the data server module 12 checks (at 110) if the transaction involves a read (but not a write) of the join view. If so, the data server module 12 checks (at 112) if there is either a Y lock or an X lock on JV. If neither a Y lock nor X lock is currently active on JV, the data server module 12 places (at 114) an S lock on the join view JV. Note that the required S lock conflicts with either a Y lock or X lock, so that the presence of either the Y lock or X lock blocks acquisition of the S lock for the received transaction. If either a Y lock or X lock is presently active on JV, the data server module 12 processes (at 108) the conflicting lock condition.

If the transaction does not involve a read of the join view JV, the data server module checks (at 116) if the transaction involves a write (but not a read) of the join view JV. If so, the data server module 12 checks (at 118) if there is either an S lock or an X lock on JV. If not, then the data server module 12 places (at 120) a Y lock on the join view JV. However, if either an S lock or an X lock is presently active on JV, the data server module 12 processes (at 108) the conflicting lock condition.

The discussion above refers to placing a table-level Y lock on a join view. The Y-lock locking mechanism for join views is extendable to also allow value locks on join views. Consider a join view JV defined on base relations $R_1$, $R_2, \ldots,$ and $R_n$. For a fixed i ($1 \leq i \leq n$), suppose that $R_1.a_i$ is an attribute of base relation $R_i$ that also appears in JV. This is the case for the example join view JV of FIG. 1. Then X and S value locking on $R_1.a_1$ for JV is allowed. For example, consider a transaction T that only updates base relation $R_1$. If the update to base relation $R_1$ specifies the value(s) of $R_1.a_i$, then transaction T can also place an IY lock on JV and one or several X value locks (not Y value locks) on $R_1.a_i$ for JV. If transaction T reads JV by specifying the $R_i.a_i$ value(s), then transaction T can put an IS lock on JV and one or several S value locks on $R_1.a_i$ for JV. If transaction T both reads and updates JV by specifying the $R_1.a_i$ value(s), then transaction T can put an IX lock on JV and one or several S value locks and X value locks on $R_i.a_i$ for JV.

The IY lock is similar to the traditional IX lock except that it is compatible with a Y lock or another IY lock. As with the IX lock, the table-level IY lock is placed on the join view JV in conjunction with an X value lock of JV to indicate to subsequent transactions that table-level X or S locks on JV are blocked (however, a table-level Y or IY lock on JV is still possible in the presence of the IY lock with X value lock). Also, a subsequent IS lock with an S value lock on JV is allowed in the presence of an IY lock with X value lock on JV. Note, however, that an X value lock on JV is incompatible with an S value lock placed on the same attribute value of JV.

For a transaction that performs both a (table-level) read and (value) write of the join view JV, both an S lock and X value lock are needed on the join view JV. In this case, a table-level SIY lock (which is equivalent to an S lock and an IY lock) is placed on JV. The SIY lock is similar to the traditional SIX lock. One can think that IX=IS+IY. An SIX lock is equivalent to an S lock and an IX lock (for an X value lock). The SIY lock is only compatible with the IS lock.

Note that SIX=S+IX=S+(IS+IY)=(S+IS)+IY=S+IY=SIY. Thus, the SIX lock is the same as the SIY lock.

If transaction T both updates JV (without specifying the $R_i.a_i$ value(s)), which is a table-write, and reads JV (specifying the $R_1.a_1$ value(s)), which is a value-read, then transaction T requires both a Y lock and S value lock(s) on JV. In this case, a table-level YIS lock is played on JV (which is equivalent to a Y lock and an IS lock). The YIS lock (Y+IS) is similar to the SIX lock and is only compatible with the IY lock.

The compatibilities of the different locks are listed in Table 1.

TABLE 1

|    | Y   | S   | X   | IS  | IY  | IX  | SIY | YIS |
|----|-----|-----|-----|-----|-----|-----|-----|-----|
| Y  | yes | no  | no  | no  | yes | no  | no  | no  |
| S  | no  | yes | no  | yes | no  | no  | no  | no  |
| X  | no  | no  | no  | no  | no  | no  | no  | no  |
| IS | no  | yes | no  | yes | yes | yes | yes | no  |
| IY | yes | no  | no  | yes | yes | yes | no  | yes |

TABLE 1-continued

|     | Y  | S  | X  | IS  | IY  | IX  | SIY | YIS |
|-----|----|----|----|-----|-----|-----|-----|-----|
| IX  | no | no | no | yes | yes | yes | no  | no  |
| SIY | no | no | no | yes | no  | no  | no  | no  |
| YIS | no | no | no | no  | yes | no  | no  | no  |

According to Table 1, a Y lock on JV is compatible with another Y lock or an IY lock on JV. However, the Y lock is incompatible with a table-level S lock, X lock, IS lock, IX lock, SIY lock, or YIS lock. Note that a table-level X lock is incompatible with any lock. An IY lock on JV is compatible with a table-level Y lock, IS lock, IY lock, IX lock, or YIS lock. However, an IY lock is incompatible with a table-level S lock, X lock, and SIY lock. An IX lock is compatible with an IS, IY, or IX lock, but not with any other locks. An SIY lock (S+IY lock) is compatible with an IS lock, but not with any other locks. A YIS lock (Y+IS lock) is compatible with an IY lock, but not with any other locks.

To show that the Y-lock locking mechanism keeps the isolation property (serializability) of transactions, the following assertions are proven for a join view JV defined on base relations $R_1, R_2, \ldots,$ and $R_n$:

Assertion 1: Transaction T's writes to join view JV are neither read (first part of Assertion 1) nor written (second part of Assertion 1) by other transactions until transaction T completes (aborts or commits).

Assertion 2: Transaction T does not overwrite dirty data of other transactions (data that is being modified by other transactions) in join view JV.

Assertion 3: Transaction T does not read dirty data of other transactions in join view JV.

Assertion 4: Other transactions do not write any data in join view JV that is read by transaction T before transaction T completes.

The four assertions are first proven for the simple case where $JV=\sigma(R_i \bowtie \ldots \bowtie R_1 \bowtie \ldots \bowtie R_n)$ where $\sigma$ denotes a selection operator. The assertions are also proven (further below) for the general case where $JV=\pi(\sigma(R_1 \bowtie \ldots \bowtie R_i \bowtie \ldots \bowtie R_n))$, where $\pi$ is a projection operator. Selection refers to selecting rows of base relations to place into JV based on the rows satisfying the join condition. Projection refers to projecting only those attributes that are in the select list of the join query into the join view JV. Less than all attributes of each base relation can be projected into the join view JV.

It is assumed that join view JV allows duplicate tuples. If no duplicate tuples are allowed in JV, assume that each tuple in JV has a dupcnt (or some other named parameter) attribute recording the number of copies of that tuple. The following assumptions are made (the other more complex cases can be proven in a similar way): (1) any transaction T updates at most one base relation of JV; and (2) if transaction T tries to update base relation $R_1(1 \leq i \leq n)$, it places a Y lock on JV and an S lock on each $R_j(1 \leq j \leq n, j \neq i)$. For example, if a join view JV is defined on base relations A, B, and C, an update of A causes an X lock or IX lock to be placed on A, and a Y lock to be placed on JV. In addition, an S lock is placed on each of the other base relations B and C.

If transaction T writes join view JV, T places a table-level Y lock on JV until T completes. If transaction T both reads and writes join view JV, T places a table-level X lock on JV until T completes. Thus transaction T's writes to join view JV are not read by any other transaction T' until transaction T completes, since T' requires a table-level S lock on JV (which would conflict with the Y lock or X lock on JV for transaction T). This proves the first part of Assertion 1

Additionally, if transaction T writes join view JV, there are two possible cases:

Case 1: Transaction T both reads and updates join view JV. In this case, transaction T puts a table-level X lock on JV until it completes. This X lock will block other transactions from writing JV (by blocking other Y or X lock requests).

Case 2: Transaction T updates the base relation $R_i(1 \leq i \leq n)$. Transaction T puts an S lock on each $R_j(1 \leq j \leq n, j \neq i)$ until T completes. If another transaction T' tries to write join view JV before transaction T completes, transaction T' can only update the same base relation $R_1$. This is because if transaction T' updates another base relation $R_j(1 \leq j \leq n, j \neq i)$ of join view JV, the requirement of an IX or X lock on $R_j$ for transaction T' will be blocked by the existing S lock on $R_j$ that is placed by transaction T.

Suppose that transactions T and T' update $\Delta R_1$ and $\Delta R_1'$ of base relation $R_1$, respectively. $\Delta R_1$ refers to the changed portion of $R_1$ made by transaction T, and $\Delta R_1'$ refers to the changed portion of $R_1$ made by transaction T'. There are three possible scenarios:

Scenario 1: If transaction T puts a table-level X lock on base relation $R_i$, transaction T' will get blocked when it tries to get either a table-level X lock or a table-level IX lock on $R_1$.

Scenario 2: If transaction T puts a table-level IX lock on base relation $R_1$, transaction T' will get blocked if it tries to get a table-level X lock on $R_1$.

Scenario 3: Suppose that transaction T puts a table-level IX lock and one or several X value locks on base relation $R_1$. Also, transaction T' tries to put a table-level IX lock and one or several X value locks on base relation $R_i$. There are two cases:

(a) $\Delta R_i \cap \Delta R_1' \neq \emptyset (\Delta R_1$ intersects with, or overlaps, $\Delta R_1'$). The requirement of X value locks on $R_i$ for transaction T' will be blocked by the existing X value locks on $R_1$ that is put by transaction T, since T and T' are changing the same portion of $R_1$ (the portion that overlaps).

(b) $\Delta R_1 \cap \Delta R_1' = \emptyset (\Delta R_i$ does not intersect with $\Delta R_1'$). Then $\sigma (R_1 \bowtie \ldots \bowtie \Delta R_1 \bowtie \ldots \bowtie \ldots \bowtie R_n) \cap \sigma (R_1 \bowtie \ldots \bowtie \Delta R_i' \bowtie \ldots \bowtie R_n) = \emptyset$. In other words, the intersection of the updates to JV by transactions T and T' is empty.

Thus transaction T's writes to join view JV are not written by any other transaction T' until transaction T completes (this proves the second part of Assertion 1).

Based on a similar reasoning to the proof of Assertion 1, transaction T does not overwrite dirty data of other transactions in join view JV (this proves Assertion 2).

Suppose that transaction T reads join view JV by requiring a table-level S lock on JV. If some other transaction T' is writing any data in join view JV, T' will place a table-level Y lock (or X lock) on JV until T' completes. The required table-level S lock on JV for transaction T will be blocked by the table-level Y or X lock on JV for transaction T'. Thus transaction T does not read dirty data from transaction T' in join view JV (this proves Assertion 3). The case that transaction T tries to both read and update the join view JV can be proved similarly, since the required X lock will be blocked by the Y or X lock for transaction T'.

If transaction T reads join view JV, T will place a table-level S lock on JV until T completes. If transaction T both reads and writes join view JV, T will place a table-level X lock on JV until T completes. Thus no other transaction T' can write any data in JV until transaction T completes, since T' requires a table-level Y lock (or X lock) on JV. This proves Assertion 4.

Figure 4A:
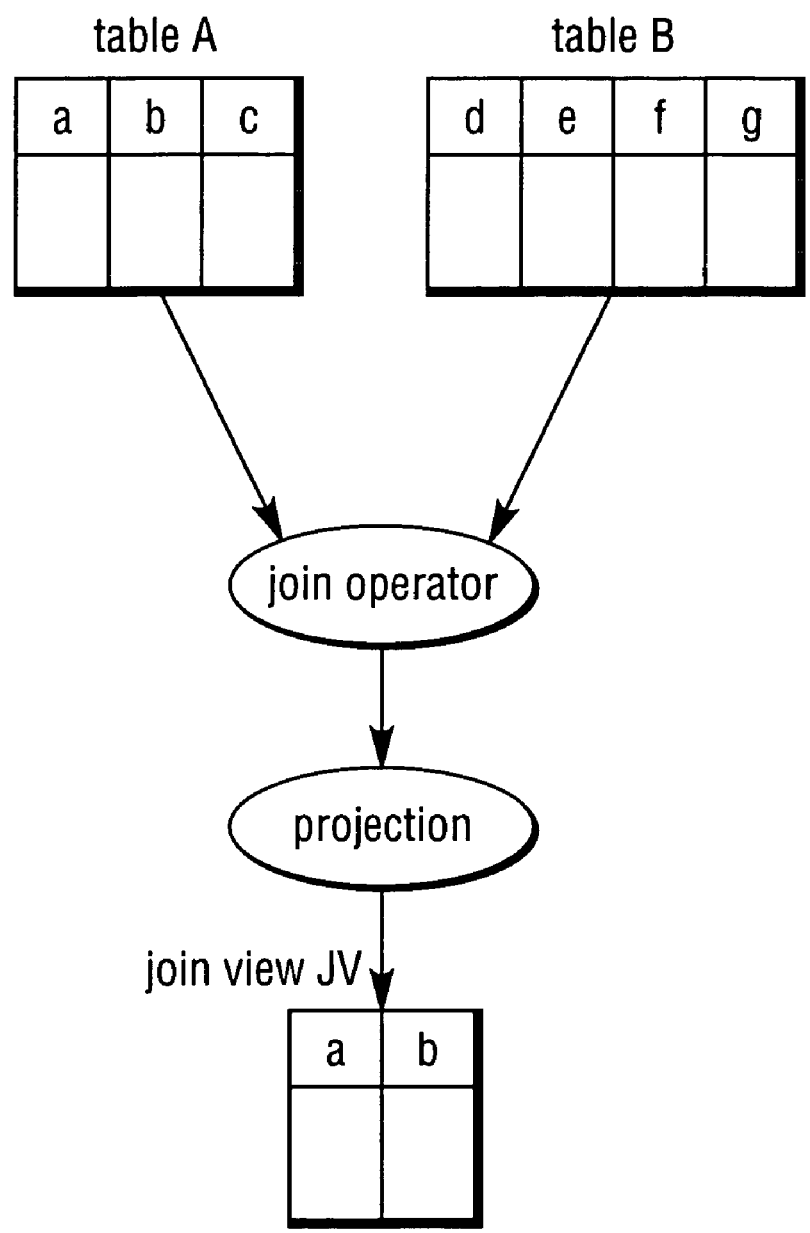

The proof for the general case where $JV = \pi(\sigma(R_1 \bowtie \ldots \bowtie R_i \bowtie \ldots \bowtie R_n))$ is discussed here. When projection is applied, less than all the attributes of the base relations $R_i(1 \leq i \leq n)$ will be in a join view JV based on the base relations $R_1, R_2, \ldots, R_n$. This is illustrated in FIG. 4A. In the example, the join view JV contains only attributes A.a and A.b. The other attribute A.c of relation A and attributes B.d, B.e, B.f, B.g of relation B are not in JV. In this general case, the proofs of the four assertions are the same except for the case where $\Delta R_i \cap \Delta R_1' = \emptyset$ in Assertion 1. In this case, a virtual join view $JV' = \sigma(R_1 \bowtie \ldots \bowtie R \bowtie \ldots \bowtie R_n)$ is defined conceptually (that is, JV' is an imaginary table that does not exist in the database system). The virtual join view is a join view without the projection applied. Therefore, JV' contains all attributes of the base relations. Each tuple in the actual join view JV comes from (and is a subset of) one tuple in JV'. Conceptually, if the tuples in JV are expanded to include all the attributes of JV', then the tuples in JV are different from each other. After computing the change $\Delta = \sigma(R_1 \bowtie \ldots \bowtie \Delta R_1 \bowtie \ldots \bowtie R_n)$, for each tuple $TA_1$ in $\Delta$, there are three possible cases:

Case 1: Tuple $TA_1$ is inserted into $\Delta$. This means that $\pi(TA_1)$ needs to be inserted into JV. We insert $\pi(TA_1)$ into JV. Conceptually, the expanded tuple of $\pi(TA_1)$ is $TA_1$.

Case 2: Tuple $TA_1$ is updated into $TA_2$ in $\Delta$. This means that tuple $\pi(TA_1)$ needs to be updated into $\pi(TA_2)$ in JV. A tuple $TA_3$ in JV that is equal to $\pi(TA_1)$ can be identified. Note that there may be several tuples in JV that are equal to $\pi(TA_1)$. However, conceptually, it can be thought that the expanded tuple of the identified tuple $TA_3$ is equal to $TA_1$. Then tuple $TA_3$ in JV is updated from $\pi(TA_1)$ to $\pi(TA_2)$. Conceptually, it can be thought that the expanded tuple of the updated $TA_3$ is $TA_2$.

Case 3: Tuple $TA_1$ is deleted from $\Delta$. This is similar to case 2.

For example, suppose each tuple without projection originally has three attributes (a, b, c). After projection, the tuple only contains two attributes (a, b). Suppose there are tuples T1=(1, 2, 3), T2=(1, 2, 4), and T3=(1, 5, 6). After projection, the tuples become T1'=(1, 2), T2'=(1, 2), T3'=(1, 5). Thus, the expanded tuple of T1' is T1, the expanded tuple of T2' is T2, and the expanded tuple of T3' is T3. Suppose the tuple T2=(1, 2, 4) is updated to (1, 8, 5). Then, after projection, one of the tuples (1, 2) is changed to (1, 8). However, T1' and T2' look the same. Suppose T1' is changed from (1, 2) to (1, 8). Note T2' originally comes from T2, so T2' should be changed instead of T1'. However, a distinction between T1' and T2' in JV cannot be made as they look the same. The tuples before the projection become T1=(1, 2, 3), T2 (1, 8, 5), and T3 (1, 5, 6). The tuples after projection become T1'=(1, 8), T2'=(1, 2), T3'=(1, 5).

However, conceptually, it can be thought that the expanded tuple of T1' is T2, the expanded tuple of T2' is T1, and the expanded tuple of T3' is T3. That is, conceptually it can be thought that the expanded tuple of the identified tuple, T1', is equal to tuple T2, even if T1' originally comes from tuple T1. Note tuples in the relation have no order. If the order of tuples in the relation is switched, the same relation can be obtained. Thus, if the order of T1' and T2' is switched, the tuples after projection become T1'=(1, 2), T2'=(1, 8), T3'=(1, 5). Then it can be thought that the expanded tuple of T' is T1, the expanded tuple of T2' is T2, and the expanded tuple of T3' is T3. The key point is that tuples in the JV with the same value have no difference and thus can be treated in any way.

Thus, conceptually, $$\pi(\sigma(R_1 \bowtie \ldots \bowtie \Delta R_1 \bowtie \ldots \bowtie R_n)) \cap \pi(\sigma(R_1 \bowtie \ldots \bowtie \Delta R_1 \bowtie \ldots \bowtie R_n)) = \emptyset.$$

That is, the intersection of the updates to JV by transactions T and T' is empty. Consequently, transaction T's writes to join view JV are not written by any other transaction T' until transaction T completes (this proves part 2 of Assertion 1 for the general case).

Figure 4B:
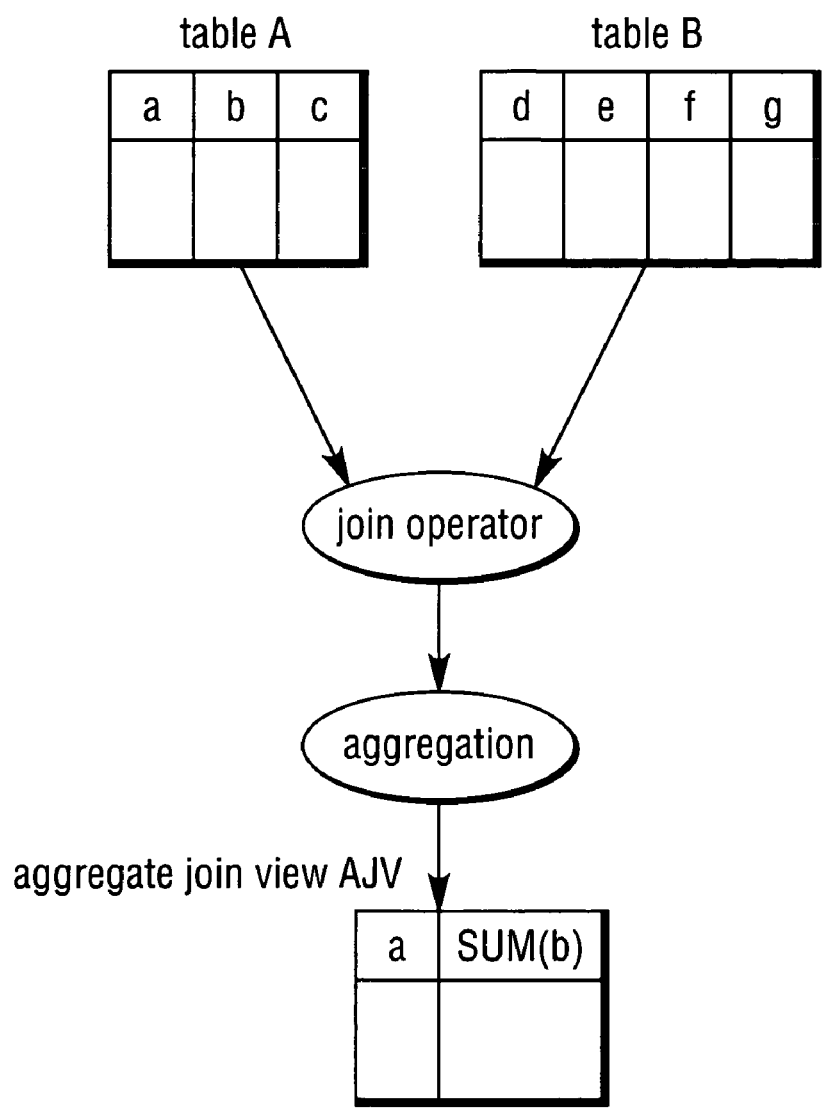

The Y-lock locking mechanism for join views also applies to aggregate join views. An example aggregate join view AJV is created as follows:
CREATE JOIN VIEW AJV AS
SELECT A.a, SUM (A.b)
FROM A, B
WHERE A.c=B.d
GROUP BY A.a;

As shown in FIG. 4B, the aggregate join view AJV contains an attribute A.a and a sum of the attribute A.b. SUM is one type of aggregate function, with other aggregate functions including COUNT, AVG, and so forth.

Consider an aggregate join view $AJV = \gamma(\pi(\sigma(R_1 \bowtie \ldots \bowtie R_1 \bowtie \ldots \bowtie R_n)))$, where $\gamma$ is the aggregation operator. A virtual (imaginary) join view $JV = \pi(\sigma(R_1 \bowtie \ldots \bowtie R_1 \bowtie \ldots \bowtie R_n))$ is defined so that $AJV = \gamma(JV)$. In other words, the aggregate join view AJV is equal to the virtual join view after aggregation.

An example of this is illustrated in FIG. 4C. Assume that the schema of AJV is (A.a, SUM(B.d))—in other words, AJV has two attributes: A.a and the sum of B.d. Assume that initially AJV has one tuple (1, 3). Subsequently, as a result of a new transaction(s), join result tuples (1, 1) and (1, 5), which are results due to a join of base relations A and B, are to be inserted into AJV. The join result tuples are not inserted into new rows of AJV, but rather, the existing row in AJV is updated by summing B.d values of the join result tuples to the existing tuple of AJV. Thus, AJV is updated by updating SUM(B.d), which is 3+1+5=9. Thus, after the update, AJV has the tuple (1, 9).

For purposes of proving the assertions above, the virtual or imaginary JV remains consistent with AJV. The schema of the virtual join view JV is (a, d). Aggregation is not performed on the virtual join view JV so that the join result tuples are added into new rows of the virtual join view JV. However, note that aggregation of the virtual join view JV will cause it to result in AJV.

Thus, whenever AJV is updated by $\Delta$, conceptually, the corresponding tuples that produce $\Delta$ are updated in the virtual join view JV. By the above reasoning, if the virtual join view JV is considered instead of the aggregate join view AJV, then any parallel execution of the transactions are equivalent to some serial execution of these transactions. AJV is always set equal to $\gamma(JV)$. Thus if the virtual join view JV is replaced by AJV, any parallel execution of the transactions are still equivalent to some serial execution of the transactions. This provides the four assertions above.

Figure 5A:
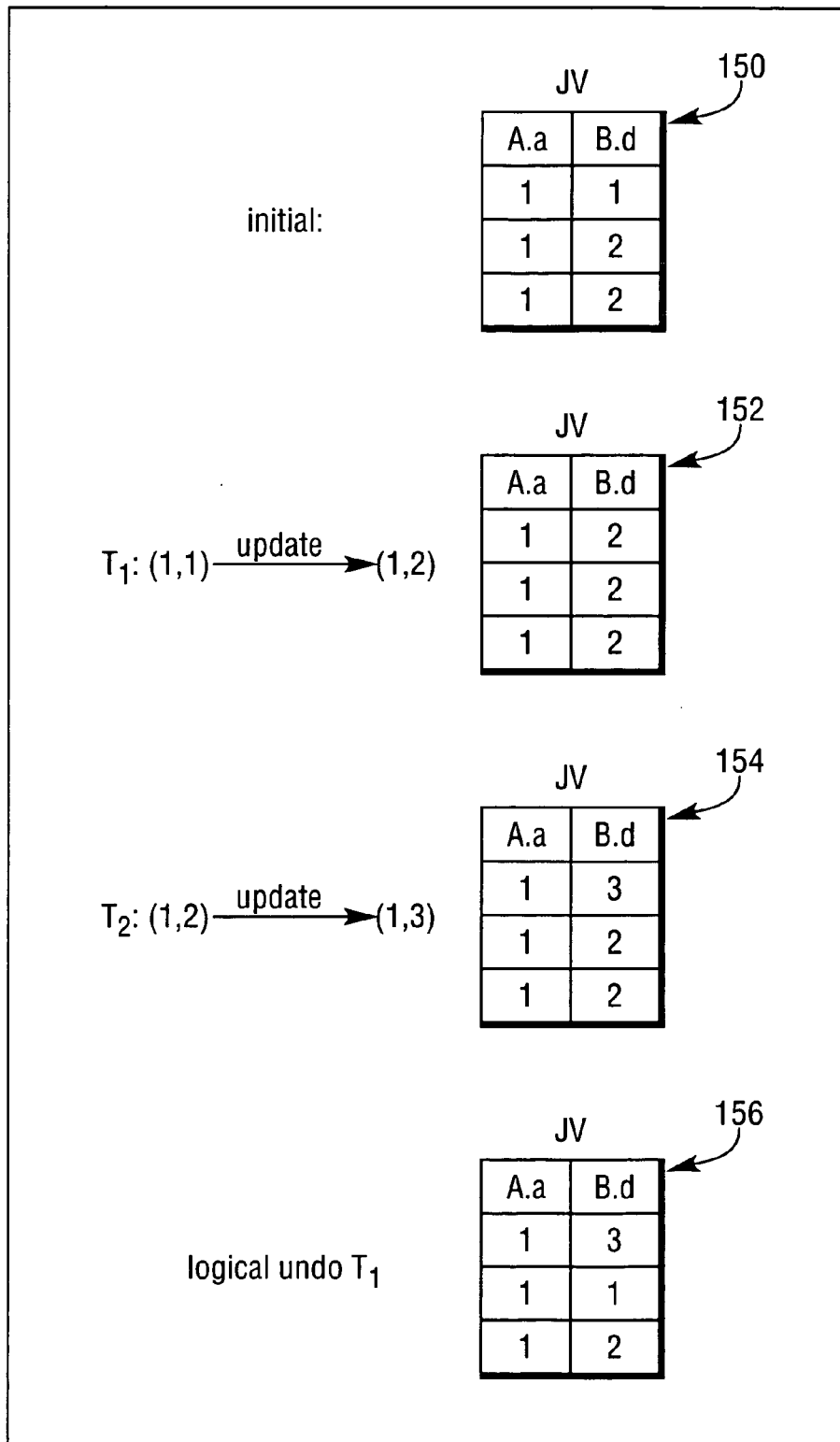
FIGS. 5A–5B illustrate examples of a logical undo mechanism.

As noted above, a benefit of the Y-lock locking mechanism is that multiple transactions can place Y locks concurrently on the same join view JV to enhance database performance. However, in the context of projection join views and aggregate join views, a physical undo of an update of a join view due to a first transaction ($T_1$) that aborts may not be possible. An example is illustrated in FIG. 5A. Assume that projection JV initially contains three tuples (1, 1), (1, 2), and (1, 2), shown as 150 in FIG. 5A. In this example, the projection JV allows duplicate tuples. The scheme of JV is (A.a, B.d). Due to projection, less than all of the attributes of base relations A and B are in the projection JV.

The first transaction $T_1$ updates the tuple (1, 1) in JV to (1, 2). The modified projection JV is shown as 152, where (1, 1) has been changed to (1, 2). In the example, another transaction $T_2$ is also active. $T_2$ updates tuple (1, 2) in JV to (1, 3). The modified projection JV is shown as 154.

After the $T_2$ update, the first transaction $T_1$ aborts. In that case, the tuple (1, 2) that was changed from (1, 1) needs to be un-updated back to (1, 1). However, that tuple has already been changed to (1, 3) by transaction $T_2$, so a physical undo of that tuple is not feasible.

In accordance with some embodiments, a logical undo is performed. In the logical undo, the database system looks for another tuple in the join view JV that has the attribute values (1, 2). That other tuple is changed to the value (1, 1) for a logical undo of transaction $T_1$, shown as 156 in FIG. 5A.

Figure 5B:
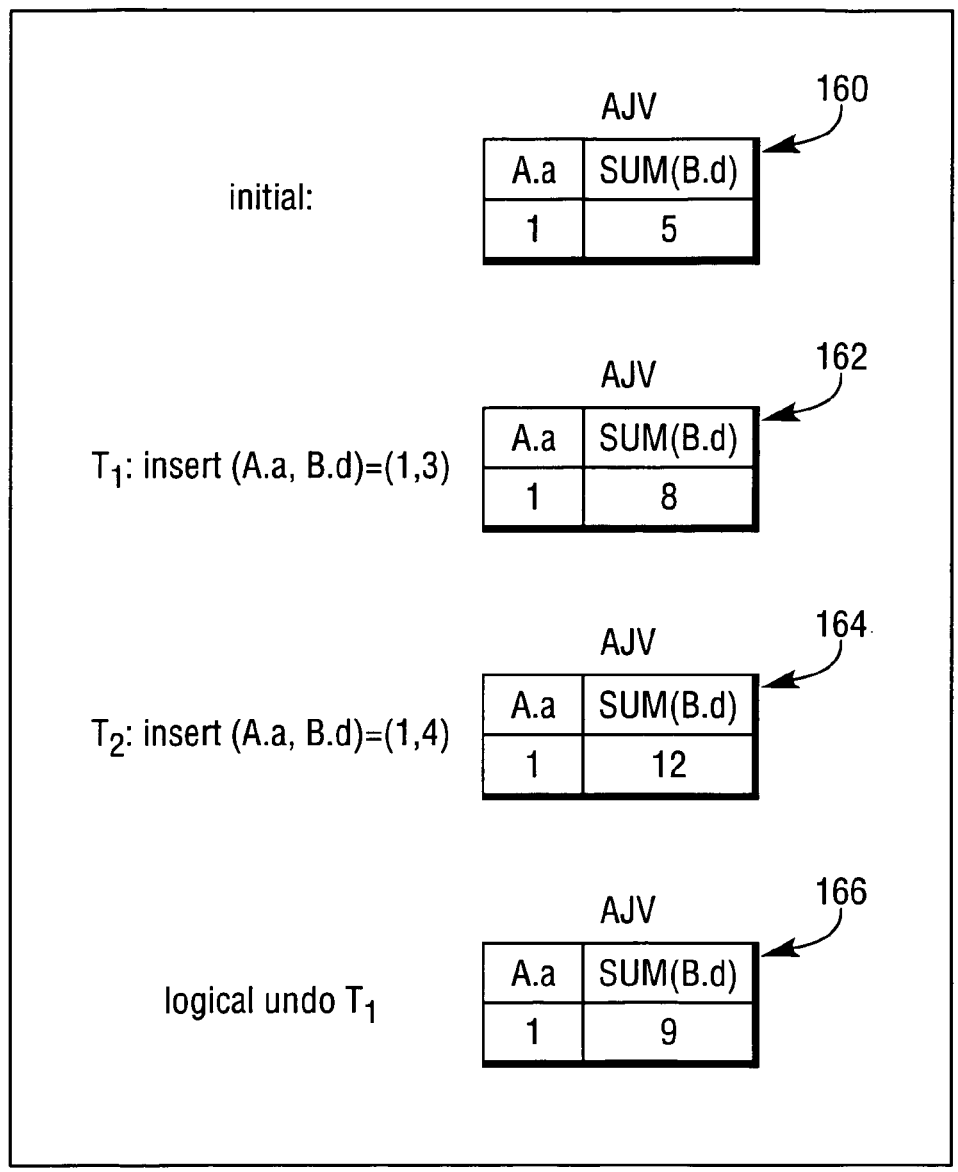

A logical undo is also used for aggregate join views. As shown in FIG. 5B, assume AJV has the scheme (A.a, SUM(B.d)) and initially has the tuple (1, 5), shown as 160. Transaction $T_1$ causes a join result tuple (1, 3), with scheme (A.a, B.d), to be inserted into AJV. This causes the AJV entry to be updated to (1, 8), shown as 162. Before $T_1$ completes, $T_2$ causes a join result tuple (1, 4) to be inserted into AJV, which causes the tuple in AJV to be updated to (1, 12), shown as 164.

If $T_1$ aborts, a physical undo is not possible, since the entry (1, 8) no longer exists in AJV. Therefore, a logical undo is performed to change the tuple (1, 12) in AJV to (1, 9), shown as 166. This removes the contribution of the (1, 3) tuple for transaction $T_1$ from the AJV.

By reducing the occurrences in which transactions block each other due to locks placed on a materialized view, such as a join view, database system performance is enhanced. This is especially beneficial in a parallel database system having plural data server modules, such as that shown in FIG. 2, where the ability to perform steps of multiple transactions on separate data server modules increases database throughout. For example, a portion of one transaction that updates the join view can be performed in a first data server module concurrently with a portion of another transaction that updates the join view on a second data server module.

IV. No-Lock Locking Mechanism

In accordance with another embodiment, instead of a Y-lock locking mechanism, a "no-lock" locking mechanism is employed for the join view JV. One purpose of placing a Y lock on a join view JV during an update of the join view in a first transaction is to prevent other transactions from reading JV, as write conflicts on the join view JV have already been handled by placing proper locks on the base relations of JV. However, in another embodiment, according to the "no-lock" locking mechanism, a Y lock (or any other type of lock) on the join view JV can be omitted while still protecting the join view JV as well as maintaining transaction serializability. A benefit of not placing any lock on the join view reduces the overhead associated with maintaining join views in response to update of base relations. Many transactions in the database system 10 are small updates that involve single-tuple or few-tuple updates to base relations of a join view. If locks (such as Y locks) are required for all such small updates, then the required locks may cause a bottleneck, since the lock manager may become tied up with many lock requests.

Figure 6:
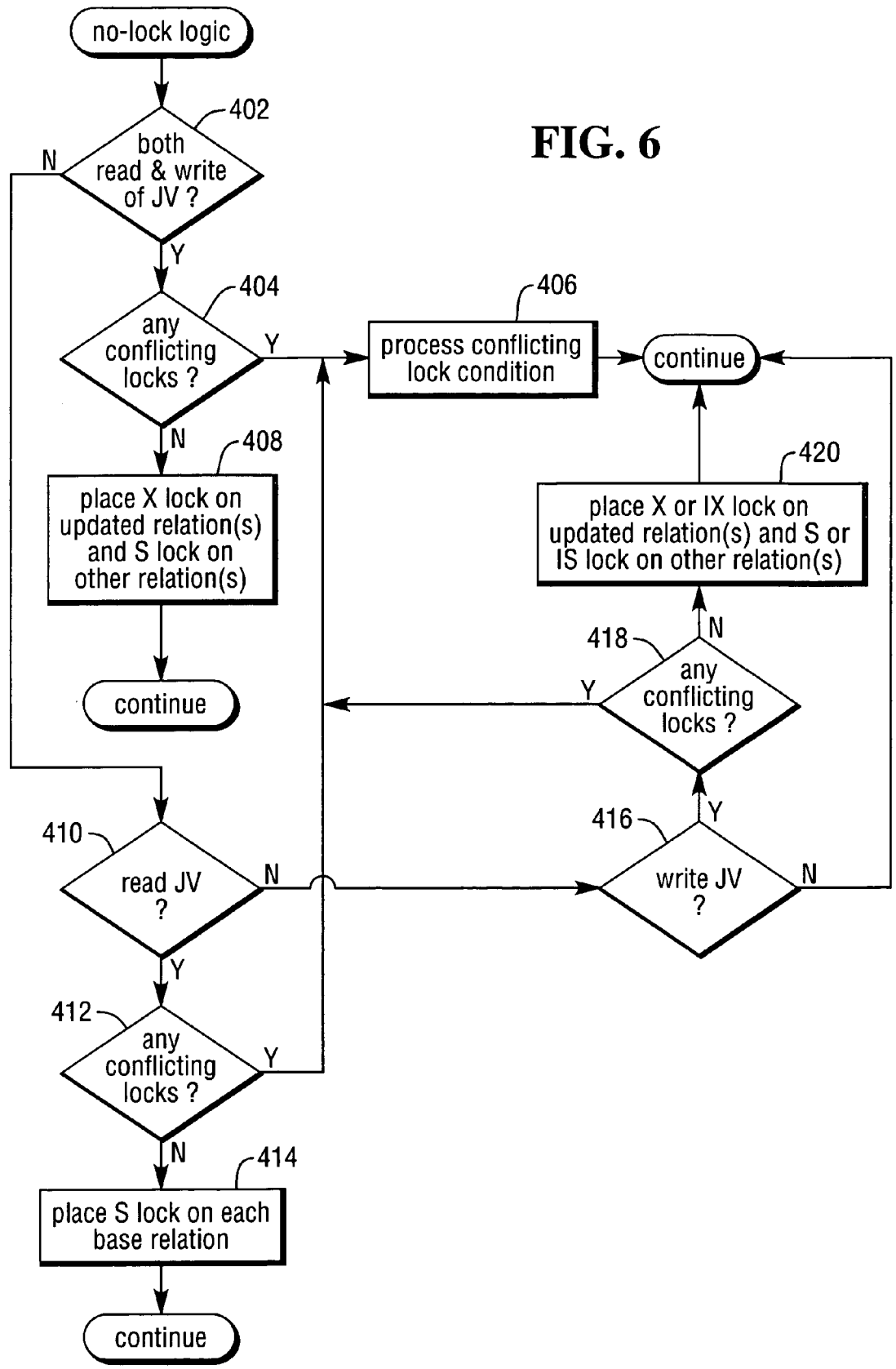
FIG. 6 is a flow diagram of logic for a no-lock locking mechanism according to another embodiment for join view maintenance.

In some embodiments, a join view cannot be directly updated or modified. In other words, a join view JV is updated or modified by updating the base relations of the join view JV. FIG. 6 illustrates the logic according to one embodiment of the no-lock locking mechanism.

In the discussion below, it is assumed that a join view JV is defined on base relations $R_1, R_2, \ldots,$ and $R_n$. As shown in FIG. 6, a data server module 12 determines (at 402) if a transaction requires both a read and write of the join view JV. A write of JV occurs through write(s) of one or more base relation(s) $R_{t_1}, R_{t_2}, \ldots, R_{t_h}$ ($\{t_1, t_2, \ldots, t_h\} \subseteq \{1, 2, \ldots, n\}$) on which JV is defined. If the data server module 12 determines (at 402) that the transaction involves both a read and write of JV, the data server module 12 next checks (at 404) if any conflicting locks are placed on the base relations $R_1, R_2, \ldots,$ and $R_n$. If so, then the data server module 12 performs (at 406) conflicting lock processing, which in one example involves waiting for the conflicting lock(s) to be released.

If no conflicting locks on the base relations are detected, then the data server module 12 places a table-level X lock (at 408) on each base relation $R_{t_u}(1 \leq u \leq h)$ that is being updated. Note that the required table-level X lock on each relation $R_{t_u}$ would conflict with an X lock, S lock, IX lock, or IS lock. The data server module 12 also places a table-level S lock on each other base relation $R_j(j \in \{1, 2, \ldots, n\} - \{t_1, t_2, \ldots, t_h\})$. Note that the table-level S lock on each $R_j$ required for the received transaction would conflict with an X lock or IX lock that has been placed on $R_j$. Thus, assuming no conflicting locks are present, an X lock is placed on each base relation that is updated, while an S lock is placed on the base relation(s) not being updated.

The table-level X lock on each base relation that is being updated can be replaced with a less restrictive SIX lock (S+IX) if the following condition is satisfied: the update of $R_{t_u}(1 \leq u \leq h)$ specifies value locking attribute values of $R_{t_u}$.

If the data server module 12 determines (at 402) that the transaction does not involve both a read and write of the join view JV, then the data server module 12 determines (at 410) if the transaction involves a read (but not a write) of JV. If so, then the data server module 12 checks (at 412) for any conflicting locks placed on the base relations $R_1, R_2, \ldots, R_n$. If a conflict is present, lock conflict processing is performed (at 406). If no conflicting lock exist, then the data server module 12 places (at 414) a table-level S lock on each base relation $R_i(1 \leq i \leq n)$ of JV. Note that the required table-level S lock on each base relation would conflict with an X lock or IX lock placed on any of the base relations.

The requirement (by the no-lock locking mechanism) of an S lock on each base relation of JV for a transaction that reads the JV differs from that of the Y-lock locking mechanism. In the Y-lock context, to read JV, only a Y lock is needed on JV, with no S locks needed on the base relations. Therefore, for reads of JV, the Y-lock locking mechanism requires less locks than the no-lock locking mechanism.

If, however, the data server module 12 determines (at 416) that the transaction involves a write (but not a read) of the join view JV through updating one or several base relations $R_{t_1}, R_{t_2}, \ldots, R_{t_n}(\{t_1, t_2, \ldots, t_h\} \subseteq \{1, 2, \ldots, n\})$ of JV, then the data server module 12 checks (at 418) for conflicting locks on any of the base relations. If no conflicting locks are present, then the data server module 12 places (at 420) an X lock or IX lock on each base relation $R_{t_u}(1 \leq u \leq h)$ being updated. An X lock is placed if a table-write of $R_{t_u}$ is needed.

An IX lock is placed if a value-write of $R_{t_u}$ is performed. In addition, the data server module 12 places an S lock or IS lock on each other base relation $R_j(j \in \{1, 2, \ldots, n\} - \{t_1, t_2, \ldots, t_h\})$ based on whether a table-read or value-read of $R_j$ is performed.

A value-write or value-read is a write or read requested by a query with a WHERE clause condition that specifies a specific value or values for the value locking attribute of the base relation. An example query that specifies a value-write is as follows:

UPDATE A
SET A.f=A.f+1
WHERE A.e=2;

where A.e is the value locking attribute of base relation A.

On the other hand, a table-write or table-read is a write or read requested by a query with a WHERE clause condition that does not specify a specific value or values for the value locking attribute of the base relation. An example query that specifies a table-read is as follows:

SELECT *
FROM A
WHERE A.f=2;

where A.f is not the value locking attribute of base relation A.

If $h \geq 2$, which means that more than one base relation $R_{t_u}$ is being updated, then an IX lock placed on each $R_{t_u}$ may need to be changed to an SIX lock (S+IX). Placing the extra S lock on each $R_{t_u}$ is needed because when one base relation (e.g., $R_{t_1}$) is being updated, then all other base relations on which JV is based are read for join view maintenance. Similarly, when $R_{t_2}$ is being updated, then all the other base relations (including $R_{t_1}$) are read for join view maintenance.

The no-lock locking mechanism requires less locks than the Y-lock locking mechanism for transactions that cause the join view JV to be updated. In the Y-lock context, for updates of JV, a Y lock is placed on JV along with an X lock (or IX lock) on each updated base relation and an S lock on each non-updated base relation. On the other hand, in the no-lock context, for updates of JV, no lock is placed on JV, with an X lock (or IX lock or SIX lock) placed on each updated base relation and an S lock placed on each non-updated base relation.

The no-lock locking mechanism for join views can be extended to allow value locks on join views. Consider a join view JV defined on base relations $R_1, R_2, \ldots,$ and $R_n$. For a fixed $i(1 \leq i \leq n)$, suppose that $R_1.a_i$ is the value locking attribute of base relation $R_1$ that also appears in JV. Then value locking on $R_i.a_1$ for JV is allowed. However, note that no lock is placed on JV according to the no-lock locking mechanism.

If transaction T reads JV by specifying $R_1.a_i$ value(s), then transaction T places an IS lock on $R_1$, one or several S value locks on $R_1.a_i$ for $R_i$ (not JV), and an S lock on each other base relation $R_j(j \neq i, 1 \leq j \leq n)$ of JV. If transaction T both updates base relation $R_1$ by specifying the $R_i.a_1$ value(s) and reads JV, an SIX lock is placed on $R_1$, one or several X value locks are placed on $R_1.a_1$ for $R_1$, and an S lock is placed on each other base relation $R_j(j \neq i, 1 \leq j \leq n)$ of JV.

To show that the no-lock locking mechanism maintains the isolation properly (serializability) of transactions, the same four assertions as for the Y-lock locking mechanism are proven. It is assumed that join view JV allows duplicate tuples. If no duplicate tuples are allowed in JV, assume that each tuple in JV has a dupcnt attribute (or some other named parameter) recording the number of copies of the tuple. The following assumptions are made (the other more complex cases can be proved in a similar way): (1) any transaction T updates at most one base relation of JV; and (2) if transaction T tries to update base relation $R_1$ ($1 \leq i \leq n$), it places an S lock on each $R_j$ ($1 \leq j \leq n$, $j \neq i$).

If transaction T writes join view JV, T places a table-level IX or X lock on the base relation being updated until T completes. Thus transaction T's writes to join view JV are not read by any other transaction T' until transaction T completes, since T' requires a table-level S lock (or X lock if T' tries to both read and update JV) on each base relation of JV. This proves the first part of Assertion 1.

In addition, if transaction T writes join view JV, there are two possible cases:

Case 1: Transaction T both reads and updates join view JV. Transaction T places a table-level X lock on the base relation being updated and an S lock on each other base relation of JV until T completes. These X and S locks will block other transactions from writing JV (by blocking other IX or X lock requests on the base relations of JV).

Case 2: Transaction T updates the base relation $R_1$($1 \leq i \leq n$). This is similar to the proof in the Y-lock context.

Thus transaction T's writes to join view JV are not written by any other transaction T' until transaction T completes (this proves the second part of Assertion 1).

Based on a similar reasoning to the proof of Assertion 1, transaction T does not overwrite dirty data of other transactions in join view JV (this proves Assertion 2).

Suppose that transaction T reads join view JV by requiring a table-level S lock on each base relation of the join view JV. If some other transaction T' writes any data in join view JV, T' will place a table-level IX or X lock on the base relation being updated until T' completes. Thus transaction T does not read dirty data from transaction T' in join view JV (this proves Assertion 3). The case that transaction T tries to both read and update the join view JV is similarly proved.

If transaction T reads join view JV, T places a table-level S lock on each base relation of the join view JV until T completes. Thus no other transaction T' can write any data in JV until transaction T completes, since T' requires a table-level IX or X lock on the base relation being updated (this proves Assertion 4). The case that transaction T tries to both read and update the join view JV is similarly proved.

Similar to the Y-lock locking mechanism, the no-lock locking mechanism can also be used for aggregate join views.

Since multiple transactions may also be able to update a join view JV concurrently using the no-lock locking mechanism, a logical undo mechanism similar to that discussed for the Y-lock mechanism is used in case a transaction aborts.

V. Name-Lock Locking Mechanism

Figure 7:
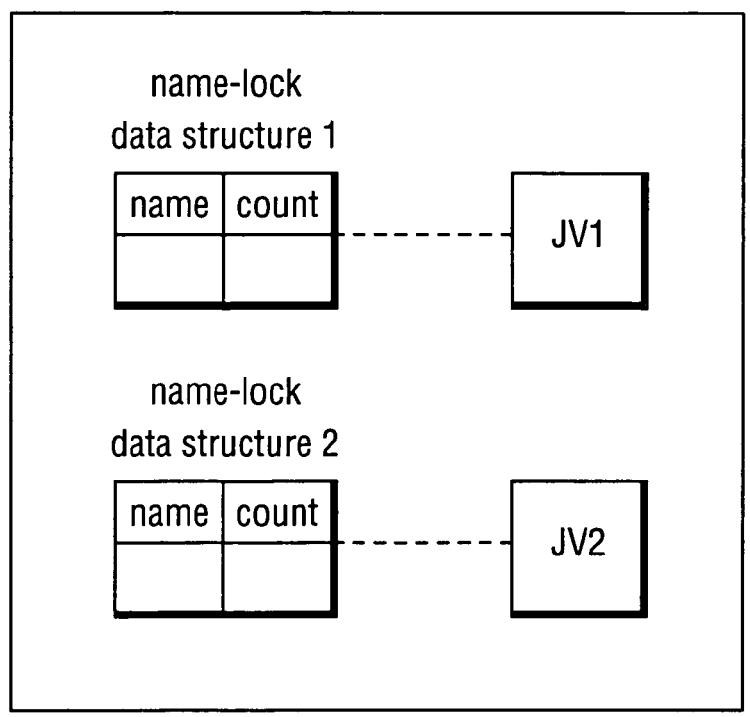
FIG. 7 illustrates a name-lock data structure used for a name-lock locking mechanism according to another embodiment.

According to another embodiment, instead of the Y-lock or no-lock locking mechanism discussed above, an alternative locking mechanism is a name-lock locking mechanism. As shown in FIG. 7, each join view is associated with a corresponding name-lock data structure. Thus, join view JV1 is associated with a first name-lock data structure, while join view JV2 is associated with a second name-lock data structure.

According to one embodiment, each name-lock data structure is of the following format: (NAME, COUNT). NAME refers to a base relation name, while COUNT refers to the number of transactions updating join view JV through updating base relation NAME. For join view JV defined on base relations $R_1, R_2, \ldots,$ and $R_n$, the value of NAME can be one of $R_1, R_2, \ldots,$ and $R_n$. Furthermore, NAME can have a special value (referred to as "Q") that is not any base relation name, but indicates that a transaction is attempting to update multiple base relations of JV or that a transaction requires both a read and update of the join view JV. Note that the designation of "Q" is provided as an example only, as other designations can be used in other embodiments.

Figure 8A:
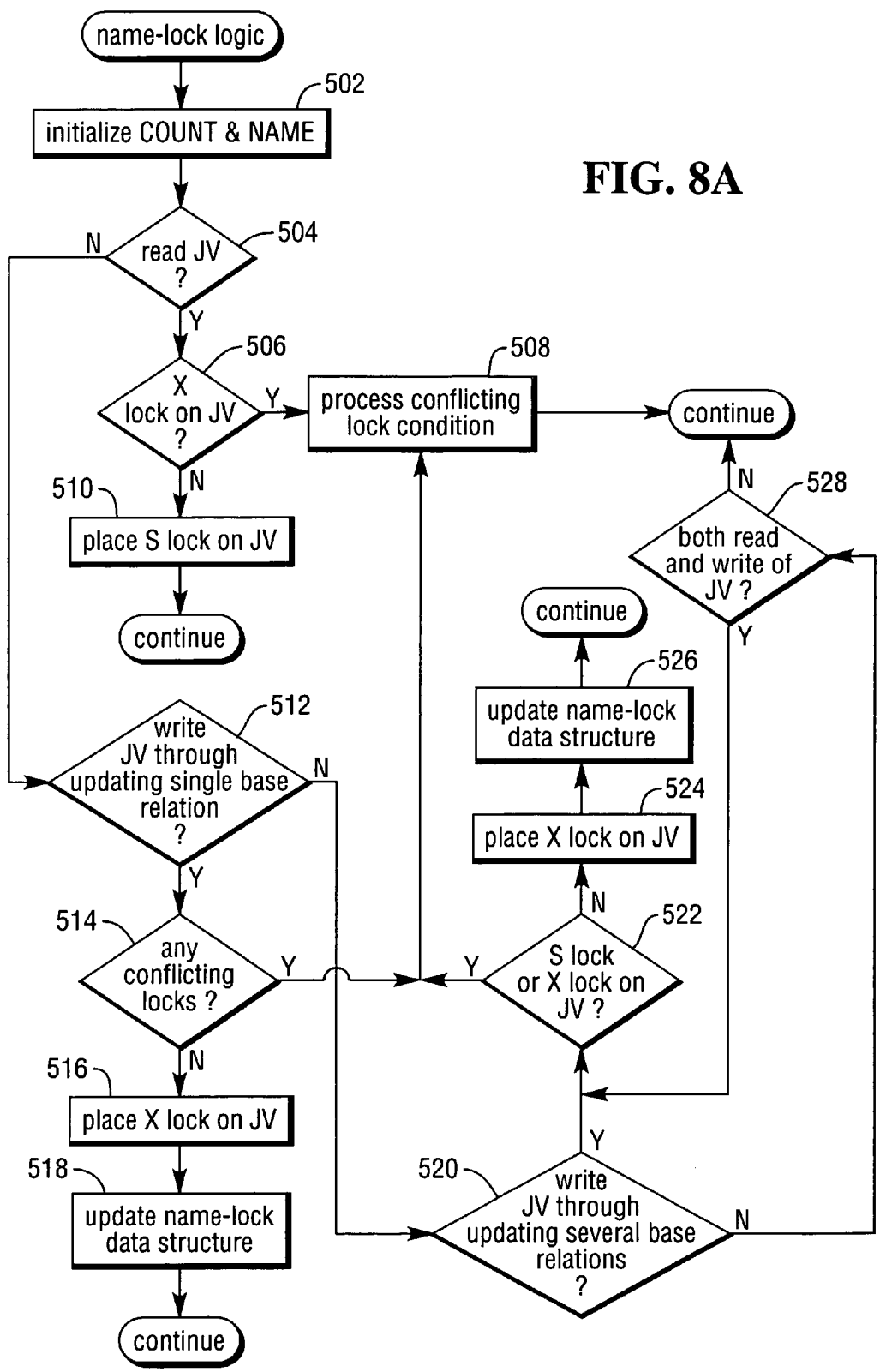
FIGS. 8A–8B are a flow diagram of logic for the name-lock mechanism for join view maintenance.
Figure 8B:
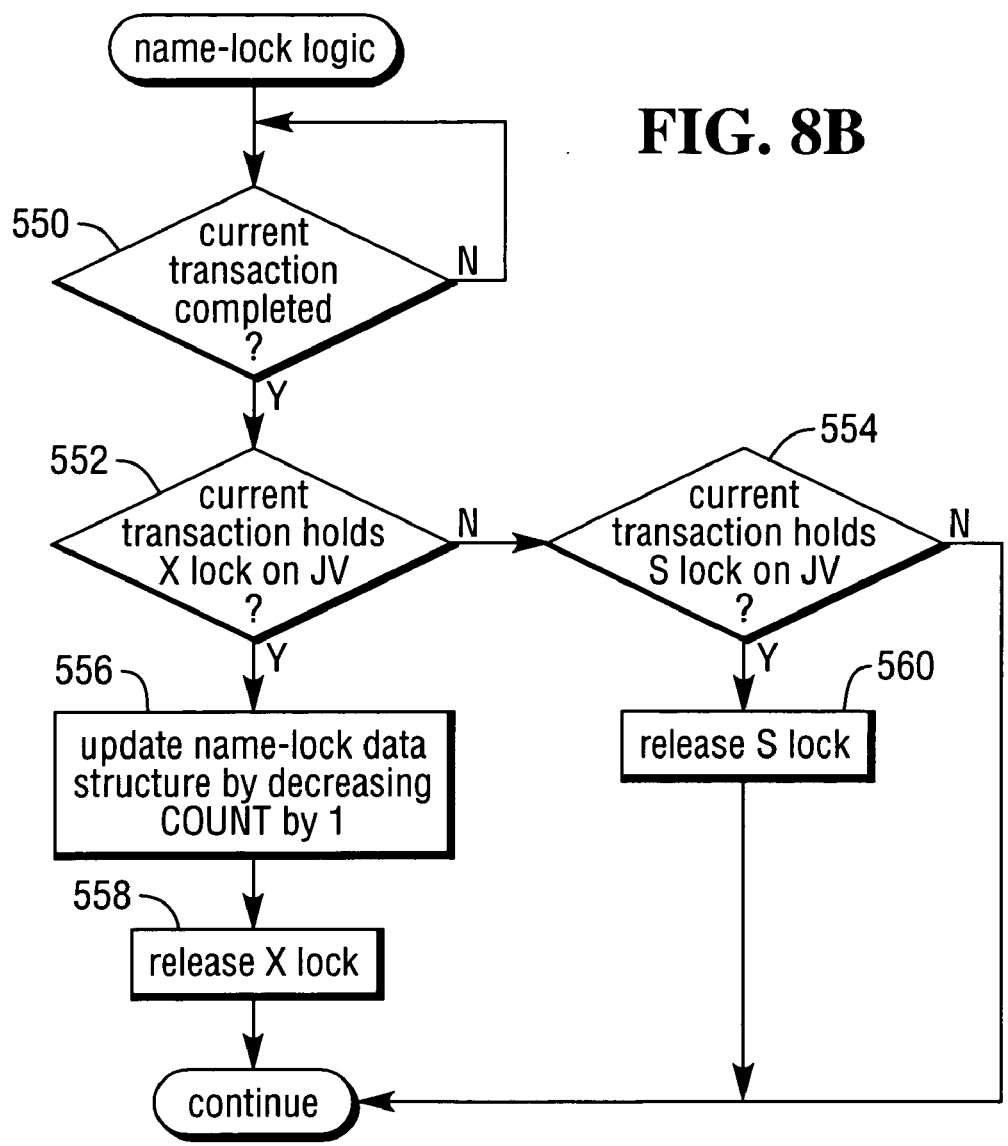

Use of the name-lock data structure is described in connection with the name-lock locking logic shown in FIGS. 8A and 8B. The value of COUNT is initialized (at 502) to zero and the value of NAME is initialized to any base relation $R_1$ ($1 \leq i \leq n$) or Q. In other words, the value of NAME is a "don't care" because the value of COUNT is equal to zero. Upon receipt of a transaction (e.g., receiving commands or steps associated with the transaction), the data server module determines (at 504) if the transaction requires a read of (but not a write to) the join view JV. If so, the data server module determines (at 506) if an X lock is already on JV. If an X lock is already on JV, then conflicting locks are processed (at 508) by the data server module. If an X lock is not already on JV, as determine at 506 by checking that the value of COUNT is equal to zero, then the data server module places (at 510) a table-level S lock on the join view JV.

If the transaction does not involve a read of the join view JV, as determined at 504, the data server module determines (at 512) if the transaction involves a write to (but not a read of) the join view JV through the update of a single base relation $R_1$ of JV. If JV is being updated through the update of a single base relation $R_1$, the data server module checks (at 514) if there is an S or X lock present on JV. The write of base relation $R_i$ in the received transaction requires an X lock on $R_i$. Thus, if an S lock already exists, then the X lock request is blocked. Similarly, if an X lock for another transaction is already placed on $R_i$, then the required X lock for the received transaction will be blocked except for the case where the X lock for the other transaction is placed on the same base relation $R_1$. The data server module checks the name-lock data structure (NAME, COUNT) to determined if an X lock is present. COUNT equals zero means that there is no other X lock granted on JV. COUNT greater than zero indicates that there is another X lock granted on JV. However, the X lock for the received transaction can be granted if the prior X lock is on the same base relation $R_i$ (that is, NAME=$R_i$). If the X lock is possible, which means that there is no S lock on $R_1$ and that either (i) COUNT=0, or (2) COUNT>0 but NAME=$R_1$, then the data server module places (at 516) the X lock on JV. The name-lock data structure is then updated (at 518) by the data server module. The update is as follows: (a) if COUNT=0, then NAME is changed to $R_1$ and COUNT is incremented by 1; or (b) if COUNT is greater than zero and NAME is equal to $R_i$, then COUNT is incremented by 1.

The acts performed at 512, 514, 516, and 518 are for a write to the join view JV through an update of a single base relation $R_i$. However, if the write to JV is a result of updating multiple base relations $R_i$ of JV, as determined (at 520), then the data server module checks (at 522) if no S lock is present on JV and no X lock is present on JV (that is, COUNT=0). In other words, an X lock for the received transaction (which involves a write to JV through the update of multiple base relations of JV) is allowed only if there is no prior S lock or X lock on JV. If this condition is true, then the data server module places (at 524) an X lock on JV.

In addition, the name-lock data structure is updated (at 526) by changing the value of NAME to Q and incrementing COUNT by 1. As a result of this X lock (with NAME=Q), all other transactions that try to read or update JV are blocked. This is contrasted to the situation where a write to JV results from an update of a single base relation $R_1$ of JV, in that the X lock (with NAME=$R_1$) does not block a subsequent transaction that tries to update JV if the subsequent transaction also involves a write to JV that results from an update of the same base relation $R_1$.

Another type of transaction, which is not any one of the transactions above, involves both a read and write of the join view JV. If the data server module detects (at 528) this type of transaction, then the acts at 522, 524, and 526 are performed to determine if an X lock, with NAME set to Q, can be placed on the join view JV.

When a transaction finishes execution (aborted or committed), the data server module checks (at 552) if this transaction has placed an X lock on the join view JV or not. If so, then the data server module updates (at 556) the name-lock data structure by decrementing COUNT by 1. Then the data server module releases the X lock (at 558) on the join view JV held by this transaction. Otherwise, the data server module checks (at 554) if this transaction has placed an S lock on the join view JV or not. If so, the data server module releases the S lock (at 560) on the join view held by this transaction.

With the name-lock locking mechanism, there are five possible scenarios in the database system at any time. In a first scenario, there is no transaction trying to read or update the join view JV. In a second scenario, several transaction are reading the join view JV concurrently. These transactions place table-level S locks on the join view JV, blocking other transactions from updating the base relations of JV.

In the third scenario, there are several transactions updating the same base relation $R_i(1 \leq i \leq n)$. These transactions all place table-level X locks on the join view JV with the parameter NAME=$R_1$. Provided the transactions updating $R_i$ do not block each other without join views, they will not block each other in the presence of join views. However, such transactions will block other transactions from either reading the join view JV or updating other base relations $R_j(j \neq i, 1 \leq j \leq n)$.

In a fourth scenario, one transaction is updating several base relations of JV simultaneously. This transaction places a table-level X lock on the join view JV, with the parameter NAME set to Q. This will block other transactions from either reading the join view JV or updating base relations $R_i(1 \leq i \leq n)$ of the join view. In a fifth scenario, one transaction is both reading the join view JV and updating one or several base relations of JV simultaneously. This scenario is similar to the fourth scenario.

As with the Y-lock and no-lock locking mechanisms, the name-lock locking mechanism can be extended to allow value locking on join views. Given a join view JV defined on base relations $R_1, R_2, \ldots, R_n$, and given $R_i.a_i$ is the value locking attribute of base relation $R_1$ that also appears in JV, then X or S value locking on $R_1.a_i$ for JV is allowed. For example, consider a transaction that only updates $R_1$. If the update of $R_i$ can be performed by value locking, then transaction T can also place an IX lock on JV and one or several X value locks on $R_1.a_1$ for JV (instead of a table-level X lock on JV with NAME=$R_1$).

To show that the name-lock locking mechanism maintains the isolation property (serializability) of transactions, for a join view JV defined on base relations $R_1, R_2, \ldots,$ and $R_n$, the same four assertions (Assertions 1–4) as for the Y-lock locking mechanism above are shown.

The four assertions are first proven for the simple case where JV=$\sigma(R_1 \bowtie \ldots \bowtie R_1 \bowtie \ldots \bowtie R_n)$. It is assumed that join view JV allows duplicate tuples. If no duplicate tuples are allowed in JV, assume that each tuple in JV has a dupcnt attribute (or some other named parameter) recording the number of copies of that tuple.

If transaction T writes join view JV, T places a table-level X lock on JV until it completes. Thus transaction T's writes to join view JV are not read by any other transaction T' until transaction T completes, since T' requires a table-level S lock on JV. This proves the first part of Assertion 1.

If transaction T writes join view JV, there are three possible cases:

Case 1: Transaction T updates several base relations of join view JV simultaneously. Transaction T places a table-level X lock on JV whose NAME=Q until T completes. The "NAME=Q" X lock will block other transactions from writing JV.

Case 2: Transaction T both reads and updates join view JV. This is similar to case 1.

Case 3: Transaction T updates one base relation $R_i(1 \leq i \leq n)$. Transaction T places a table-level X lock on JV whose NAME=$R_i$ until T completes. If another transaction T' tries to write join view JV before transaction T completes, transaction T' can only update the same base relation $R_1$. This is because if transaction T' updates several base relations of join view JV, the requirement of a "NAME=Q" X lock on JV for transaction T' will be blocked by the existing "NAME=$R_i$" X lock on JV that is put by transaction T. Similarly, if transaction T' updates another base relation $R_j(1 \leq j \leq n, j \neq i)$ of join view JV, the requirement of a "NAME=$R_j$" X lock on JV for transaction T' will be blocked by the existing "NAME=$R_1$" X lock on JV that is placed by transaction T.

Suppose that transactions T and T' update $\Delta R_i$ and $\Delta R_i'$ of base relation $R_1$, respectively. There are three possible scenarios:

Scenario 1: If transaction T places a table-level X lock on base relation $R_i$, transaction T' will get blocked when it tries to get either a table-level X lock or a table-level IX lock on $R_1$.

Scenario 2: If transaction T places a table-level IX lock on base relation $R_1$, transaction T' will get blocked if it tries to get a table-level X lock on $R_1$.

Scenario 3: Suppose that transaction T places a table-level IX lock and one or several X value locks on base relation $R_1$. Also, transaction T' tries to place a table-level IX lock and one or several X value locks on base relation $R_1$. There are two cases:

(a) $\Delta R_1 \cap \Delta R_1' \neq \emptyset$. The requirement of X value locks on $R_1$ for transaction T' will be blocked by the existing X value locks on $R_i$ that is placed by transaction T.

(b) $\Delta R_1 \cap \Delta R_1' = \emptyset$. Then
$\sigma(R \bowtie \ldots \bowtie \Delta R_1 \bowtie \ldots \bowtie R_n) \cap \sigma(R_1 \bowtie \ldots \bowtie \Delta R_1' \bowtie \ldots \bowtie R_n) = \emptyset$. That is, the intersection of the updates to JV by transactions T and T' is empty.

Thus transaction T's writes to join view JV are not written by any other transaction T' until transaction T completes (proof of second part of Assertion 1).

Based on a similar reasoning to the proof of Assertion 1, transaction T does not overwrite dirty data of other transactions in join view JV (proof of Assertion 2).

Suppose that transaction T reads join view JV by requiring a table-level S lock on JV. If some other transaction T' writes any data in join view JV, T' places a table-level X lock on JV until T' completes. Thus transaction T does not read dirty data from transaction T' in join view JV, since the required S lock on JV conflicts with the X lock on JV by transaction T' (proof of Assertion 3).

If transaction T reads join view JV, T places a table-level S lock on JV until T completes. Thus no other transaction T' can write any data in JV until transaction T completes, since T' requires a table-level X lock on JV. This proves Assertion 4.

In the general case where $JV=\pi(\sigma(R_1 \bowtie \ldots \bowtie R_1 \bowtie \ldots \bowtie R_n))$, the proofs of the four assertions are the same except for the case where $\Delta R_1 \cap \Delta R_1' = \emptyset$ in Assertion 1. For this general case, the proof is the same as the above for the Y-lock locking mechanism.

The name-lock locking mechanism for join view also applies to aggregate join view. The proof is the same as for the Y-lock locking mechanism, described above.

A first special case for which the name-lock locking mechanism can be modified to enhance parallel execution of transactions is described. Consider a join view $JV=A \bowtie B$. Suppose that the join condition of $A \bowtie B$ is A.c=B.d, where A.c and B.d are the value locking attributes of base relations A and B, respectively. Consider the following two transactions $T_1$ and $T_2$. Transaction $T_1$ inserts tuple $T_{A1}$ into base relation A and tuple $T_{B1}$ into base relation B. Transaction $T_2$ inserts tuple $T_{A2}$ into base relation A and tuple $T_{B2}$ into base relation B. Assume that $T_{A1}.c$, $T_{B1}.d$, $T_{A2}.c$, and $T_{B2}.d$ are different from each other. Then transactions $T_1$ and $T_2$ can be executed in parallel by changing the name-lock locking mechanism as follows:

(1) For transaction $T_1$, an IX lock and an IS lock are placed on both A and B, an X value lock is placed on A for $T_{A1}.c$, an S value lock is placed on B for $T_{A1}.c$, an X value lock is placed on B for $T_{B1}.d$, and an S value lock is placed on A for $T_{B1}.d$. No table-level X or S lock is placed on either A or B.

(2) For transaction $T_2$, an IX lock and an IS lock are placed on both A and B, an X value lock is placed on A for $T_{A2}.c$, an S value lock is placed on B for $T_{A2}.c$, an X value lock is placed on B for $T_{B2}.d$, and an S value lock is placed on A for $T_{B2}.d$. No table-level X or S lock is placed on either A or B.

(3) For transaction $T_1$, a table-level X lock is placed on JV whose NAME=A (instead of NAME=Q).

(4) For transaction $T_2$, a table-level X lock is placed on JV whose NAME=A (instead of NAME=Q).

Thus, even though each of transactions T1 and T2 is updating multiple base relations of the join view JV, the requirement of an X lock with NAME=Q can be avoided if the join condition $A \bowtie B$ is A.c=B.d and A.c and B.d are the value locking attributes of A and B, respectively. Instead of NAME=Q, the X lock placed on JV is performed with NAME=$R_1$ (the name of the base relation being updated).

In this way, when transactions $T_1$ and $T_2$ do not conflict with each other without the join view JV, they also do not conflict with each other in the presence of the join view JV. The general principle for this first special case is as follows: consider a join view JV defined on base relations $R_1$, $R_2, \ldots,$ and $R_n$. Suppose that the join condition among base relations $R_{t_1}$, $R_{t_2}, \ldots,$ and $R_{t_h}(\{t_1, t_2, \ldots, t_h\} \subseteq \{1, 2, \ldots, n\})$ is $R_{t_1}.a_1 = R_{t_2}.a_2 = \ldots = R_{t_h}.a_h (h \geq 2)$, where $R_{t_i}.a_i (1 \leq i \leq h)$ is the value locking attribute of base relation $R_{t_i}$. A fixed $R_{t_u}$ $(1 \leq u \leq h)$ is picked in advance. Consider a transaction T updating base relations $R_{s_1}$, $R_{s_2}, \ldots,$ and $R_{s_v}(v \geq 1)$ simultaneously. If $\{s_1, s_2, \ldots, s_v\} \subseteq \{t_1, t_2, \ldots, t_h\}$ and the update to any base relation $R_{s_i}(1 \leq i \leq v)$ can be done by value locking on $R_{s_i}$, then only an X lock needs to be placed on the join view JV whose NAME=$R_{t_u}$ (instead of NAME=Q if $v \geq 2$).

Figure 9:
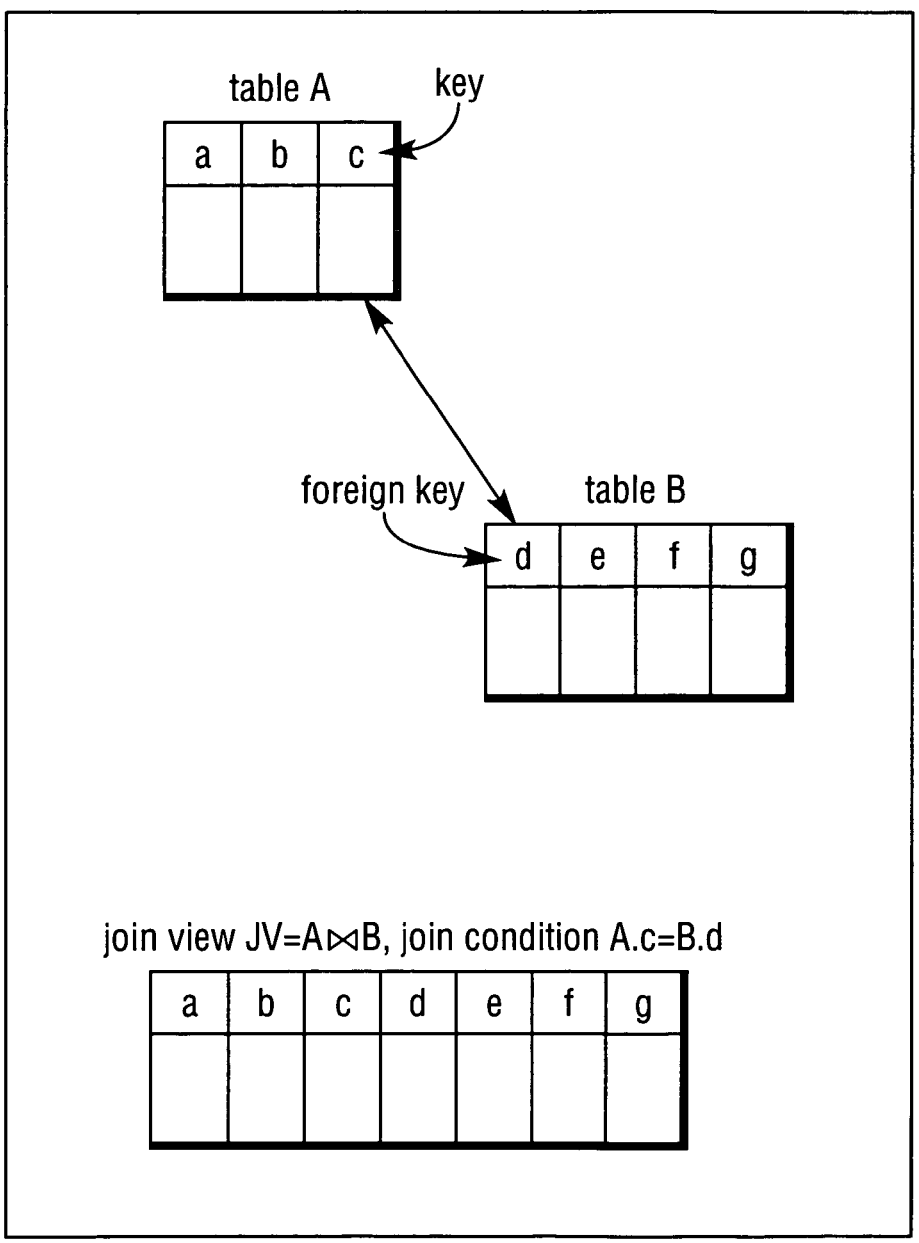
FIG. 9 illustrates join view maintenance in the presence of a key-foreign key constraint.

A second special case for which the name-lock locking mechanism can be modified to enhance performance involves the key-foreign key constraint. An example to illustrate the second special case is as follows: consider a join view $JV=A \bowtie B$, as shown in FIG. 9. Suppose that the join condition of $A \bowtie B$ is A.c=B.d, where A.c is a key of A and B.d is a foreign key of B that references A.c. Also suppose that A.c and B.e are the value locking attributes of base relations A and B, respectively. If transaction T inserts a tuple $T_A$ into base relation A, transaction T does not need to put any lock on B or JV for join view maintenance, as there can be no matching tuple in B that can be joined with $T_A$.

A foreign key identifies table relationships. For example, table A can be a customer table, with A.c being the customer identifier and the other attributes of A describing various aspects of each customer. There is one row per customer in table A. Table B is a customer order table that contains orders of each customer, with B.d being the customer identifier. Inserting a new row into A means that a new customer (associated with a new customer identifier A.c) is being added to A. Therefore, since A.c is new, there can be no row in the customer orders table (table B) that contains order information for the new customer.

Transaction T only needs to put an IX lock on A and an X value lock on A for $T_A.C$ for the newly inserted $T_A$. On the other hand, if transaction T inserts a tuple $T_B$ into base relation B, transaction T needs to put an IS lock on A and an S value lock on A for $T_B.d$ to do join view maintenance. Transaction T also needs to put an IX lock on B, an X value lock on B for $T_B.e$, and a table-level X lock on JV whose NAME=B.

The general principle is as follows: consider a join view JV defined on base relations $R_1, R_2, \ldots,$ and $R_n$. Suppose that the join condition between base relations $R_i(1 \leq i \leq n)$ and $R_j(j \neq i, 1 \leq j \leq n)$ is $R_i.a_1 = R_j.a_j$, where $R_1.a_i$ is a key of $R_1$ and $R_j.a_j$ is a foreign key of $R_j$ that references $R_1.a_i$. Also suppose that $R_i.a_i$ is the value locking attribute of base relations $R_1$, and $R_j.b_j$ is the value locking attribute of base relations $R_j$. Then if transaction T inserts a tuple $T_i$ into base relation $R_1$, transaction T requires the following locks: an IX lock on $R_i$ and an X value lock on $R_1$ for $T_i.a_1$. If transaction T inserts a tuple $T_j$ into base relation $R_j$, transaction T requires the following locks: an IS lock on $R_1$, an S value lock on $R_i$ for $T_j.a_j$, an IX lock on $R_j$, an X value lock on $R_j$ for $T_j.b_j$, and a table-level X lock on JV whose NAME=$R_j$.

A logical undo mechanism is similarly used for the name-lock locking mechanism.

VI. Auxiliary Relations

Figure 10:
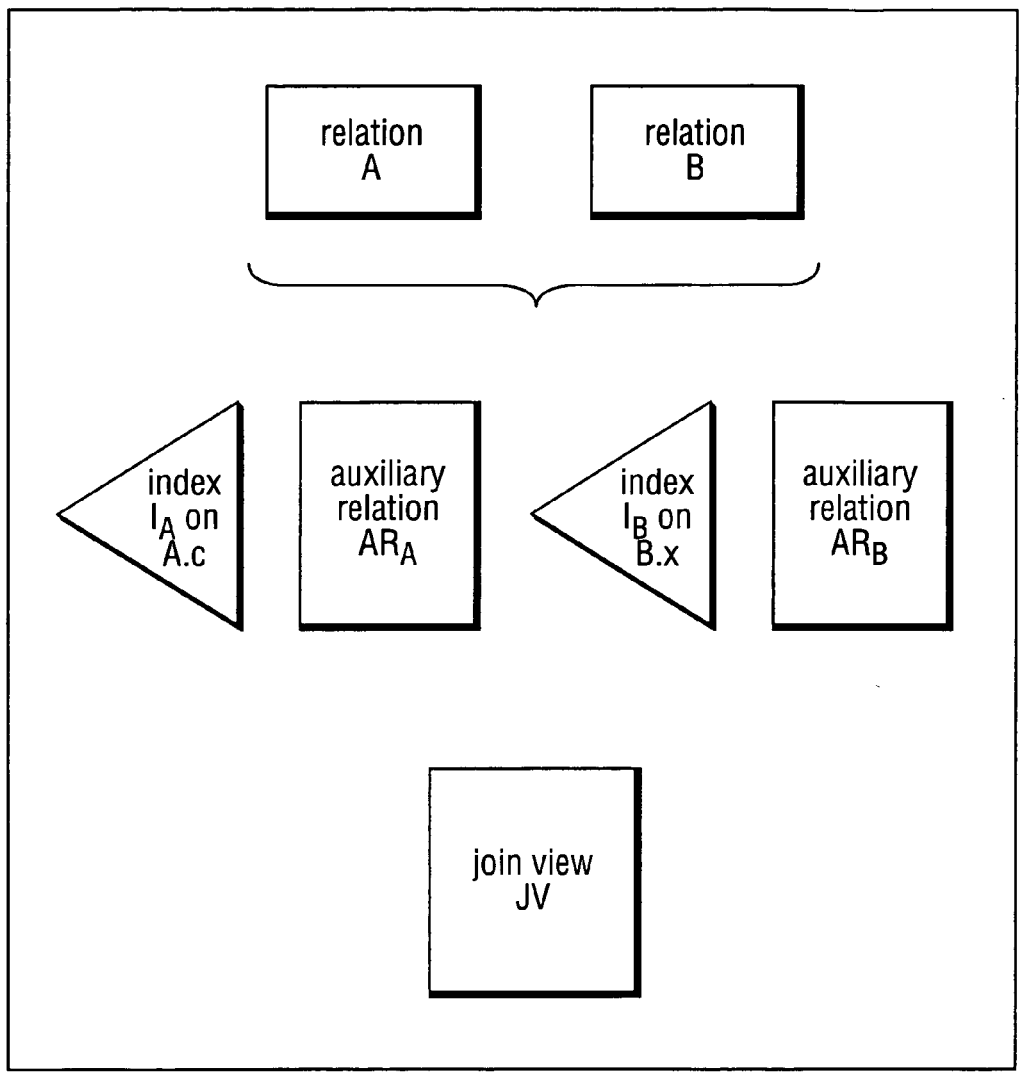
FIG. 10 illustrates auxiliary relations used for join view maintenance.

Several locking mechanisms have been described above to improve transaction concurrency in the database system by reducing the occurrences in which locks placed on a join view, and/or base relations on which the join view is based, will cause transactions to block each other from execution. According to one embodiment, auxiliary relations are also optionally used to maintain join views. The use of auxiliary relations makes join view maintenance more efficient, especially in the parallel database system shown in FIG. 2. As depicted in FIG. 10, in one example, auxiliary relations $AR_A$ and $AR_B$ are derived from base relations A and B. Additionally, a join view JV is generated from relations A and B, as shown. Assume the join view JV contains tuples selected by the join condition A.c=B.x. Also, the join view JV is partitioned on A.e. Auxiliary relation $AR_A$ is a copy of relation A that is partitioned on the join attribute A.c. Likewise, auxiliary relation $AR_B$ is a copy of relation B that is partitioned on the join attribute B.x. Where relation A (B) is already partitioned on attribute A.c (B.x), no auxiliary relation $AR_A$ ($AR_B$) is generated, as it is not needed.

Additionally, in one embodiment, a clustered index is maintained on each auxiliary relation. Index $I_A$ is maintained on attribute A.c for auxiliary relation $AR_A$. Likewise, index $I_B$ is maintained on attribute B.x for auxiliary relation $AR_B$. In FIG. 10, the index is depicted as a triangle adjacent to the auxiliary relation upon which the index is maintained.

The auxiliary relations $AR_A$ and $AR_B$ are constructed based on a reorganization of the tuples $T_A$ and $T_B$ of base relations A and B, respectively, in which the join attributes (A.c and B.x) influence the construction. Auxiliary relations $AR_A$ and $AR_B$ thus include all the tuples of relations A and B, respectively, with the tuples simply being rearranged.

In one embodiment, the data structures of FIG. 10 are maintained in the parallel database management system 10 of FIG. 2, which has L data server modules (L being greater than one). In such a parallel database system, tuples of relations A and B are distributed across multiple data server modules.

Auxiliary relations $AR_A$ and $AR_B$, as well as the join view JV, are also distributed across the data server modules of the parallel database system. The partitioning strategy for each of auxiliary relations $AR_A$ and $AR_B$ determines the node upon which the tuples $T_{ARA}$ and $T_{ARB}$ of the auxiliary relations are stored.

In an example join view definition, tuple $T_A$ of relation A is to be joined with one or more tuples $T_B$ of relation B in which attribute c of $T_A$ equals attribute x of one or more tuples $T_B$. In one embodiment, the join operation is performed using, not relations A and B, but the auxiliary relations $AR_A$ and $AR_B$. Then, the join result tuples are stored in the join view JV.

As noted above, a materialized join view must be maintained as base relations of the join view are modified. This means that, as each existing tuple is updated or deleted or as each new tuple is inserted into either relation A or B, the materialized view is updated so as not to become stale. The efficiency of maintenance of the materialized view depends on how the data is organized. Auxiliary relations are used to perform materialized join view maintenance, in accordance with some embodiments, to enhance efficiency. FIGS. 11A, 11B, 12A, and 12B show how materialized view maintenance may be performed without the use of auxiliary relations.

Take, for example, a join view JV, constructed from relations A and B. If base relations A and B are partitioned on the join attributes A.c and B.x, respectively, performing the join operation is relatively efficient, since tuples $T_A$ whose "c" attributes are equal to the "x" attribute of tuples $T_B$ are stored on the same node. In the ensuing discussion, the term "node" is used broadly to refer to a data server module 12.

In a database system with multiple nodes, assume node i includes tuples $T_A$ in which attribute "c" is between 1 and 5. Also, node i includes tuples $T_B$ in which attribute "x" is between 1 and 5. Other tuples $T_A$ and $T_B$ of relations A and B are stored at nodes other than node i in the parallel DBMS. The join of (A.c=B.x) of tuples $T_A$ and $T_B$ is relatively efficient in this arrangement, since the tuples $T_A$ and $T_B$ are stored on the same node i.

Where the join view JV is also partitioned according to either attribute "c" of relation A or attribute "x" of relation B, the join result tuples also remain at node i. However, where the join view JV is not partitioned on these attributes, however, the join result tuples may need to be sent to the other node(s).

Figure 11A:
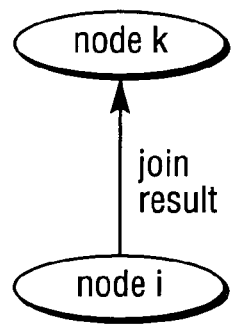
FIGS. 11A–11B and 12A–12B illustrate join view maintenance without auxiliary relations.

More generally, assume the join view JV is partitioned on an attribute of relation A. Incoming tuple $T_A$ is joined with the appropriate tuple or tuples of relation B at node i. The join result tuples (if any) are sent to some node k based on the attribute value of $T_A$, as shown in FIG. 11A. The join result tuples are inserted into the join view JV there. Node k may be the same as node i.

Figure 11B:
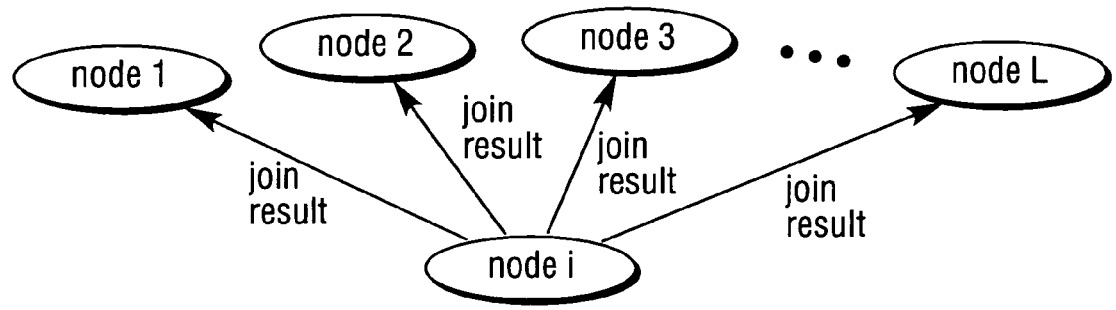

If, instead, the join view JV is not partitioned on an attribute of relation A, the distribution of join result tuples is depicted in FIG. 11B. Since the join view JV is not partitioned on an attribute of base relation A, the join result tuples are distributed to multiple nodes to be inserted into the join view JV there.

The situation is worse when the base relations A and B are not partitioned on the join attributes. Instead of going to a node (such as node i) in which "like" tuples will be present, multiple nodes of the parallel database system may have to be accessed to find tuples $T_A$ or $T_B$ that meet the join criteria.

Figure 12A:
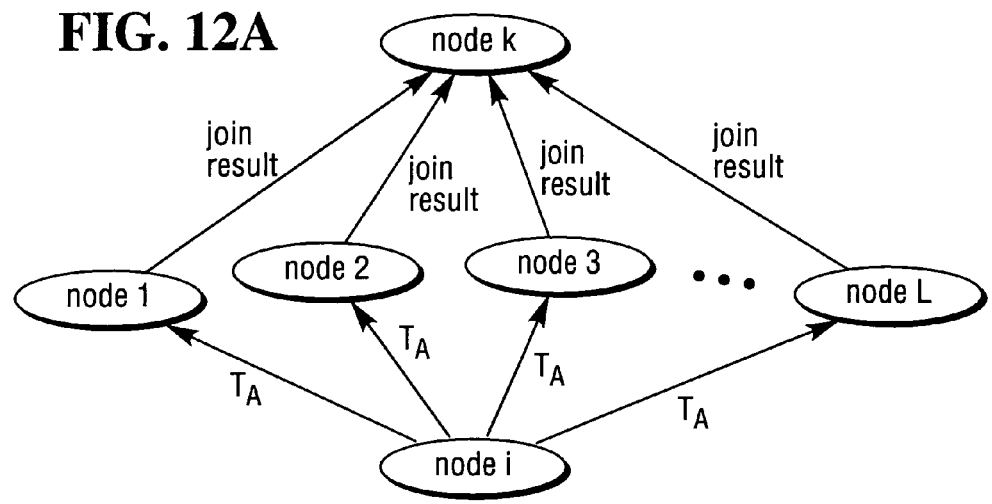
Figure 12B:
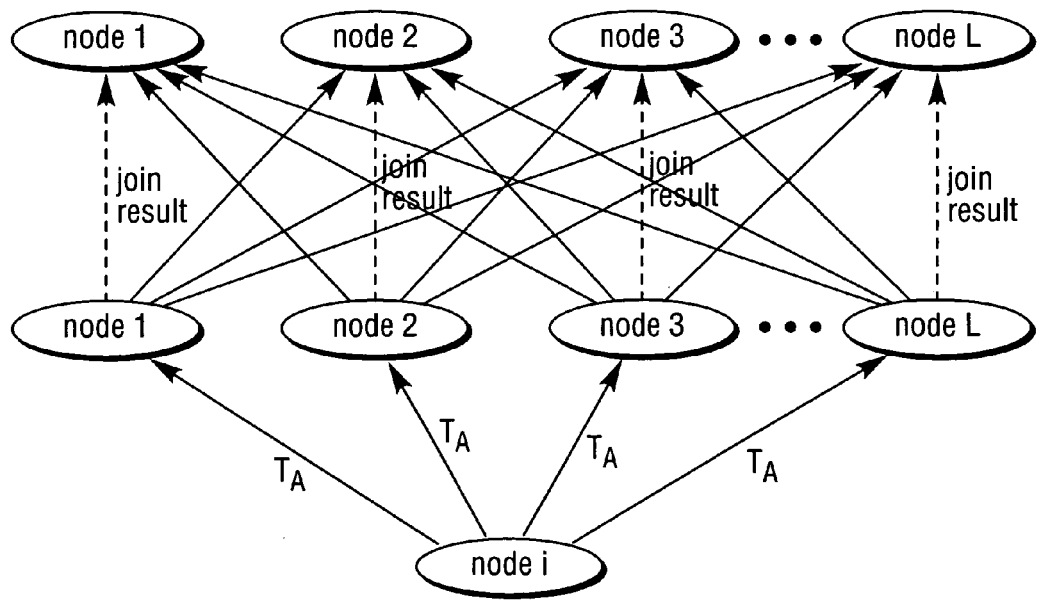

In FIGS. 12A and 12B, maintenance of the join view JV is illustrated where the base relations A and B are partitioned on attributes that are not the join attributes, i.e., not A.c and B.x, respectively. In such a situation, not only are the join result tuples possibly distributed to multiple nodes, but the incoming tuple $T_A$ itself is distributed to all the nodes of the parallel database system, to ensure that all possible tuples $T_B$ that meet the join criteria are considered. In FIG. 12A, for example, the join view JV is partitioned on an attribute of A. Tuple $T_A$ is distributed to every node to search for tuples $T_B$ which meet the join criteria (A.c=B.x). The join result tuples (if any) are sent to some node k to be inserted into the join view JV based on the attribute value of $T_A$. Again, node k may be the same as node i.

In FIG. 12B, the join view JV is not partitioned on an attribute of relation A. As in FIG. 12A, the tuple $T_A$ is redistributed to every node to search for the tuples $T_B$ that meet the join condition. The join result tuples, if any, are distributed to multiple nodes to be inserted into the join view JV there. The dashed lines in FIG. 12B indicate that the network communication is conceptual as the message is sent to the same node.

Thus, as can be seen from the example of FIGS. 12A, and 12B, without the use of auxiliary relations, materialized view maintenance may be inefficient and costly (in terms of system resources) where the base relations A and B are partitioned on attributes that are not join attributes, since substantial network communication costs may be incurred. Further, a join operation has to be performed at every node.

According to one embodiment, auxiliary relations are used to overcome the shortcomings of the join view maintenance techniques described above. In general, an auxiliary relation is maintained for each relation involved in the join operation. For the general case, it is assumed that neither base relation is partitioned on the join attribute. If, however, some base relation is partitioned on the join attribute, the auxiliary relation for that base relation is unnecessary, in one embodiment.

Where a join view JV is defined on base relations A and B, two auxiliary relations, $AR_A$ for relation A, and $AR_B$ for relation B, are maintained. Relation $AR_A$ is a copy of relation A that is partitioned on the join attribute A.c. Relation $AR_B$ is a copy of relation B that is partitioned on the join attribute B.x. Additionally, as depicted in FIG. 10, index $I_A$ on attribute c of relation A is maintained for auxiliary relation $AR_A$. Likewise, index $I_B$ on attribute x of relation B is maintained for auxiliary relation $AR_B$.

By maintaining auxiliary relations $AR_A$ and $AR_B$ for relations A and B, respectively, assurance can be made that, at any node i of the parallel database system, tuples $T_A$ coexist with tuples $T_B$ in which the join attributes are of the same value. In other words, where the tuples $T_A$ and $T_B$ of relations A and B are not organized such that tuples meeting the condition A.c=B.x coexist at the same node, such a condition is provided using tuples $T_A$ and $T_B$ of auxiliary relations $AR_A$ and $AR_B$.

Figure 13A:
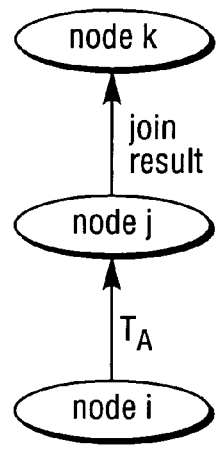
FIGS. 13A–13B illustrate join view maintenance with auxiliary relations.
Figure 13B:
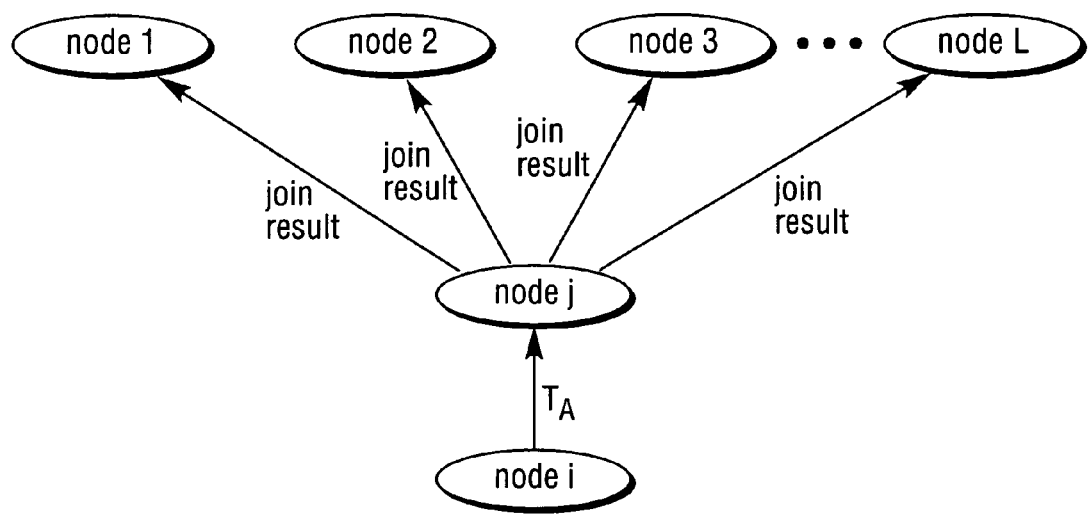

One procedure for maintaining a join view using auxiliary relations is depicted in FIGS. 13A and 13B, according to one embodiment. When a tuple $T_A$ is inserted into relation A at node i, the tuple is also redistributed to a specific node j, based on the join attribute value A.c of the tuple. Node j may be the same as node i. Tuple $T_A$ is inserted into the auxiliary relation $AR_A$ at node j. At node j, $T_A$ is joined with the appropriate tuples $T_B$ in the auxiliary relation $AR_B$, where the auxiliary relation $AR_B$ utilizes the index $I_B$ to quickly obtain the appropriate tuples $T_B$.

In FIG. 13A, the join view JV is partitioned on an attribute of A. Thus, it is possible that the join result tuple is stored on the same node as $T_A$. The join result tuples (if any) are sent to some node k to be inserted into the join view JV based on the attribute value of $T_A$. Node k may be the same as node j.

In FIG. 13B, the join view JV is not partitioned on an attribute of A. Accordingly, the join result tuples (if any) are distributed to multiple nodes to be inserted into the join view JV there. For example, each join result tuple may be sent to a different node in the parallel database system.

Operations in which tuple $T_A$ is deleted from base relation A or updated in base relation A are similarly performed. Also, when a tuple $T_B$ is inserted into, deleted from, or updated in base relation B, similar operations are performed.

By using one or more auxiliary relations, the join view may be maintained more efficiently. In one embodiment, network communication is reduced. For each inserted (updated, deleted) tuple of base relation A, the join work to be done occurs at one node rather than at every node of the parallel database system. Further, for each inserted (updated, deleted) tuple of base relation A, the auxiliary relation $AR_B$ at one node (rather than at all nodes) is locked when performing the join operation. In one embodiment, this improves accessibility to the base relation B while join view maintenance is being performed.

In one embodiment, the storage overhead for each auxiliary relation may be kept relatively small in many cases. For example, if a join view has some selection condition on the base relation A in the where clause, such as:

CREATE JOIN VIEW JV AS
SELECT *
FROM A, B
WHERE A.c=B.x AND A.e=3;

only those tuples of A that satisfy the selection condition (A.e=3) need be maintained in the auxiliary relation $AR_A$.

As another example, a join view does not contain all attributes of the base relation A, such as:

CREATE JOIN VIEW JV AS
SELECT A.e, B.z
FROM A, B
WHERE A.c=B.x;

The auxiliary relation $AR_A$ may maintain fewer than all the attributes of relation A. In the above example, the auxiliary relation $AR_A$ may maintain only the join attribute (A.c) and the attributes appearing in the select clause (A.e). Accordingly, $AR_A$ would include attributes c and e of base relation A.

Another example involves the join condition in the join view that is based on key and referential integrity restraints, such as:

CREATE JOIN VIEW JV AS
SELECT *
FROM A, B
WHERE A.c=B.x;

Where A.c is a key of relation A and B.x is a foreign key of relation B that references to A.c. If a tuple $T_A$ is inserted into relation A, there is no matching tuple in relation B that can be joined with $T_A$. However, if a tuple $T_B$ is inserted into relation B, there must be a tuple of relation A that can be joined with it. The case for deletion is similar. Thus, in one embodiment, if only insertion and deletion in the base relations is considered, only the auxiliary relation $AR_A$ is maintained. There is no need for auxiliary relation $AR_B$.

A further discussion of maintaining a view with auxiliary relations is described in U.S. Ser. No. 09/900,280, filed on Jul. 6, 2001, by Gang Luo, Curt J. Ellmann, and Jeffrey F. Naughton, which is hereby incorporated by reference.

VII. Auxiliary Indices

Figure 14:
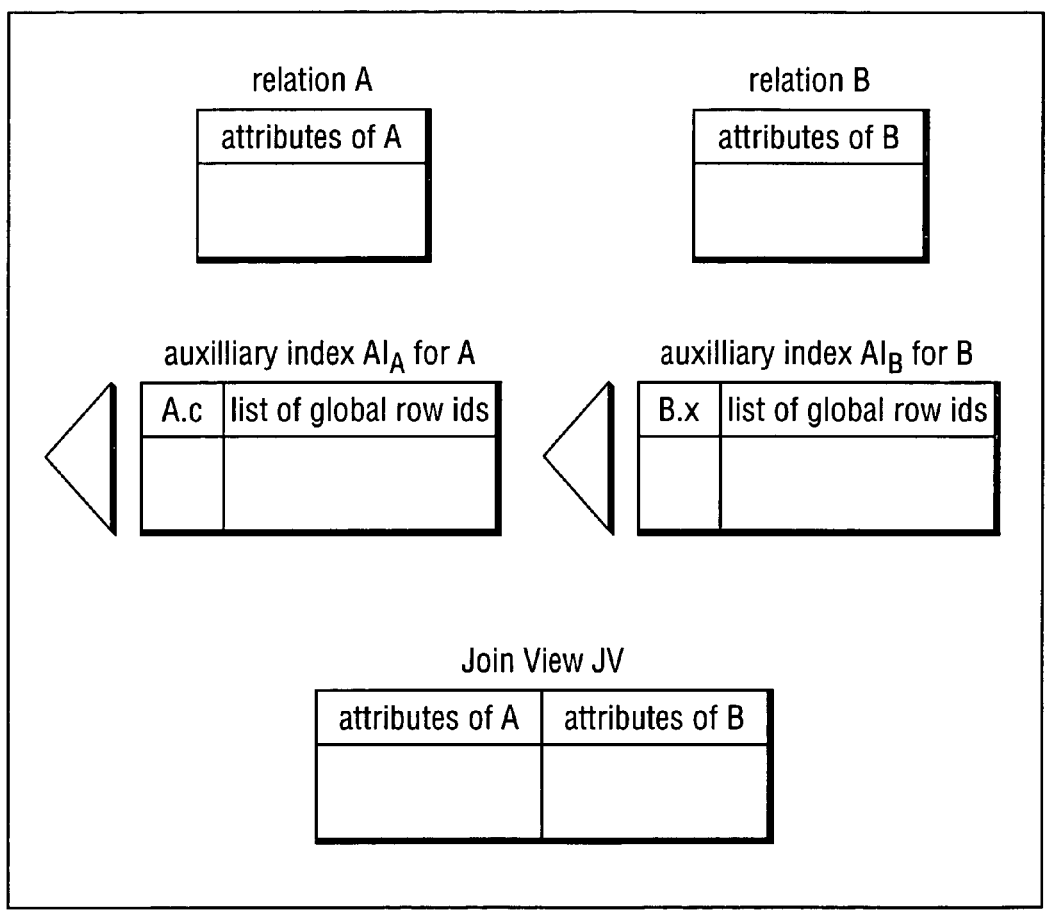
FIG. 14 illustrates auxiliary indices used for join view maintenance.

Instead of auxiliary relations, which require relatively substantial storage overhead in some cases, auxiliary indices can be used instead. For each base relation A and B on which a join view JV is maintained, an auxiliary index $AI_A$ (for relation A) and an auxiliary index $AI_B$ (for relation B) are also maintained, as shown in FIG. 14.

Auxiliary index $AI_A$ is an index on the join attribute A.c. $AI_A$ is partitioned on A.c. Each entry of the auxiliary index is in the form (value of A.c, list of global row identifiers), where the list of global row identifiers contains all the global row identifiers of the tuples of relation A whose attribute A.c is of that value. Each global row identifier is of the form (node identifier, local row identifier at the node). A local row identifier uniquely identifies a row of a relation at a node. A global row identifier uniquely identifies a row of a relation among all the nodes.

The auxiliary index $AI_A$ is distributed clustered if the base relation is clustered on the join attribute A.c at each node. On the other hand, the auxiliary index $AI_A$ is non-distributed clustered if the base relation is non-clustered on the join attribute at each node. An auxiliary index $AI_B$ is similarly maintained for relation B, and is of the form (value of B.x, list of global row identifiers).

Figure 15A:
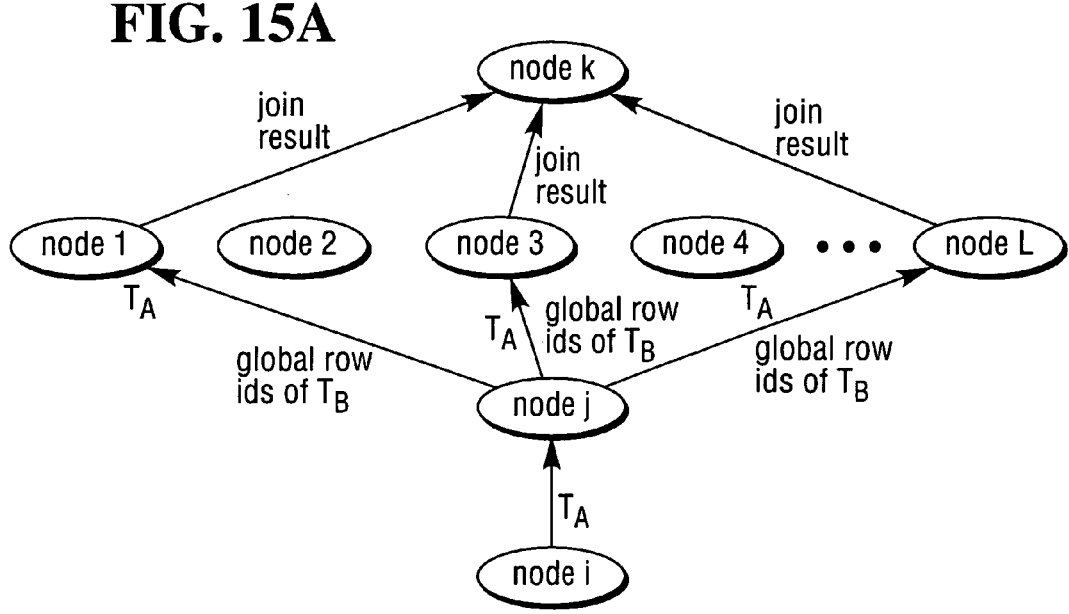
FIGS. 15A–15B illustrate join view maintenance with auxiliary indices.

As shown in FIG. 15A, when a tuple $T_A$ is inserted into relation A at node i, the tuple $T_A$ is also redistributed to a specific node j (node j may be the same as node i) based on the join attribute value of $T_A$. A new entry containing the global row identifier of tuple $T_A$ is inserted into the auxiliary index $AI_A$ at node j. The auxiliary index $AI_B$ at node j is then searched to find the list of global row identifiers for these tuples $T_B$ of relation B that satisfy $T_B.X=T_A.c$. Suppose those tuples $T_B$ reside at K (K≦L) nodes. $T_A$ with the global row identifiers of the node is sent to each of the K nodes. In the example of FIG. 15A, the K nodes include nodes 1, 3, and L. The tuple $T_A$ is joined with tuple $T_B$ of relation B identified by those global row identifiers in the K nodes. If JV is partitioned on an attribute of A, then the join result tuples (if any) are sent to some node k (which may be the same as node j) to be inserted into JV based on the attribute value of $T_A$.

Figure 15B:
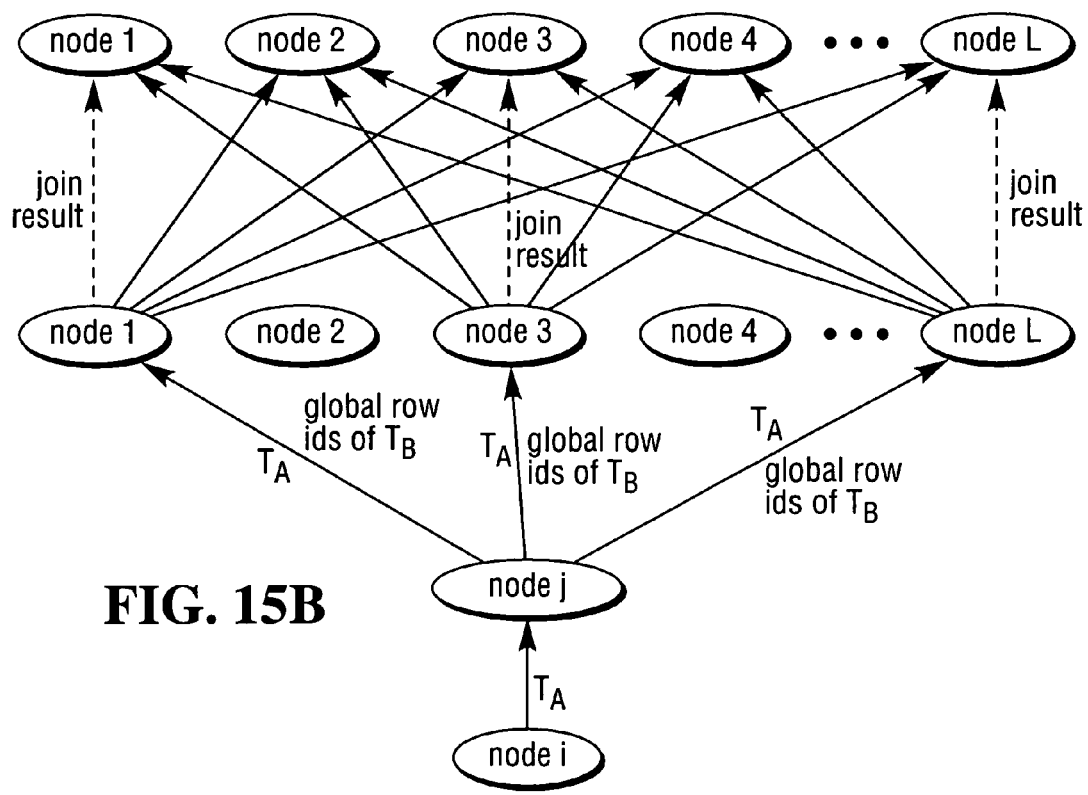

However, if JV is not partitioned on an attribute of A, then the join result tuples are distributed to plural nodes to be inserted into JV, as shown in FIG. 15B. The procedure for handling deletion of rows of A or updates of rows of A are similar to the procedure performed in the case of insertion.

Generally, auxiliary indices have less storage overhead than auxiliary relations. However, join view maintenance with auxiliary indices incur more inter-node communication than for join view maintenance with auxiliary relations, but less inter-node communication than for join view maintenance without either auxiliary indices or auxiliary relations (see FIG. 12B). For each inserted (deleted, updated) tuple of base relation A, the join work needs to be done at (i) only one node with the auxiliary relation mechanism, (ii) several nodes for the auxiliary index mechanism, and (iii) all the nodes without either the auxiliary index or auxiliary relation mechanism.

The auxiliary index mechanism can also be extended to maintain a join view JV defined on more than two base relations. For optimal performance, a hybrid mechanism that includes both the auxiliary relation mechanism and the auxiliary index mechanism can be used.

VII. Locking Mechanisms for Auxiliary Relations and Auxiliary Indexes

When base relations are updated and materialized views are incrementally updated, the proper locks are placed on the base relations; there is no need to place any X or S lock on any auxiliary relation according to one embodiment. However, short-term latches on pages and locks on access paths placed by the database system are needed. In an alternative embodiment, locks can be placed on the auxiliary relation when reading or updating the auxiliary relation.

For example, in one embodiment, an X or S lock on an auxiliary relation $AR_R$ for base relation R is not needed because the auxiliary relation $AR_R$ is only updated when base relation R is updated. Therefore, the X or IX lock placed on R will prevent a subsequent conflicting update on R that causes $AR_R$ to be updated. Similarly, an auxiliary relation $AR_R$ is only read when some join view defined on base relation R is being maintained (with an S or IS lock placed on R). Thus, while a first transaction is ready for join view maintenance, the S lock or IS lock on R blocks any subsequent conflicting update of $AR_R$ through the update of R (which requires an X or IX lock on R).

Similarly, in the auxiliary index context, according to one embodiment, only proper locks are needed on base relations when base relations are updated and materialized views are being incrementally maintained. Locks on the auxiliary index are not needed. In an alternative embodiment, locks can be placed on the auxiliary index when reading or updating the auxiliary index.

Generally, for an auxiliary relation $AR_R$ of base relation R, there are three possible scenarios in the parallel database system:

(1) No transaction is trying to read or updated auxiliary relation $AR_R$.

(2) One or several transactions are updating base relation R, and thus the auxiliary relation $AR_R$ is also being updated. Table-level IX or X locks are placed on R so no other transaction can read $AR_R$ (because such other read requires an S lock on R).

(3) One or several transaction are reading auxiliary relation $AR_R$ to perform join view maintenance. Table-level S locks are placed on R so no other transaction can update auxiliary relation $AR_R$.

Similar scenarios exist for auxiliary index $AI_R$ kept on base relation R.

A logical undo mechanism is also applied to the lock mechanism for auxiliary relations and auxiliary indices.

Figure 16:
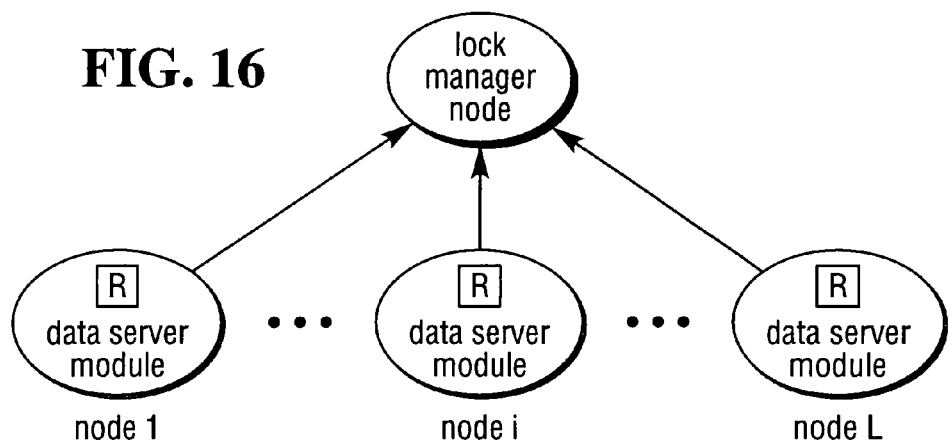
FIG. 16 is a block diagram of a database system with a centralized lock manager mechanism.

VIII. Example Application of No-Lock Locking Mechanism for Join View with Join View Maintenance Performed with Auxiliary Indices FIG. 16 shows a traditional (S, X, IS, IX) locking mechanism in a parallel database system with L data server modules. Each data server module is also referred to as node i ($1 \leq i \leq L$). Also, for each relation, there is a centralized node on which the lock manager resides. As a result, to place a value lock, a data server module has to send a message to the lock manager at the centralized node to place a corresponding IX or IS lock for an entire relation R that is distributed or partitioned across the multiple data server modules. Thus, with the centralized (S, X, IS, IX) locking mechanism of FIG. 16, placing a value lock on the relation R is relatively expensive, as the data server module has to send a message across a communications network to the lock manager at the centralized node. Thus, value locking cannot be performed locally with the centralized locking mechanism. On the other hand, placing the table-level X or S lock is relatively efficient with the centralized locking mechanism, as a message can be sent to the centralized node to place a lock on the entire relation R.

Figure 17:
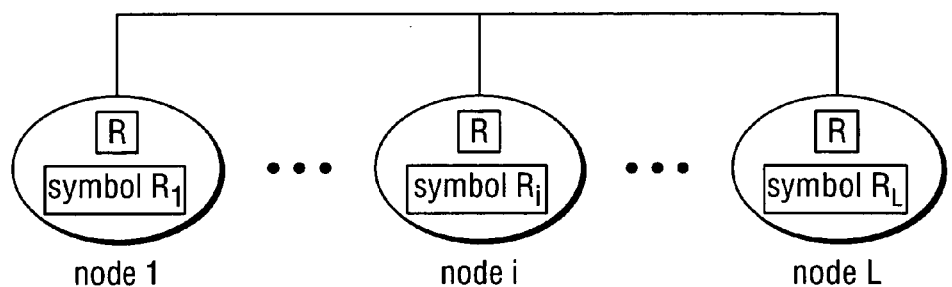
FIG. 17 is a block diagram of a database system with a distributed lock manager mechanism.

FIG. 17 shows a distributed (S, X, IS, IX) locking mechanism, in which value locks for R are partitioned among all L nodes. Thus, at each node i ($1 \leq i \leq L$), there is a symbol $R_1$ for R. If a table-level X or S lock is to be placed on R, then a message is sent to every node i ($1 \leq i \leq L$) to X or S lock the symbol $R_1$. To place a value X or S lock on R, there is no need to go to a centralized node to get the table-level IX or IS lock on R. Instead, assuming that the value lock resides at node i, an IX or IS lock is first placed on the symbol $R_1$, followed by acquiring the value X or S lock at node i. Thus, for placing value locks, there is no centralized node that can become a bottleneck in the distributed locking mechanism. However, compared to the centralized locking mechanism, acquiring a table-level X or S lock is more expensive in the distributed locking mechanism, as an X or S lock has to be placed on the symbol $R_1$ at each node i ($1 \leq i \leq L$).

Figure 18:
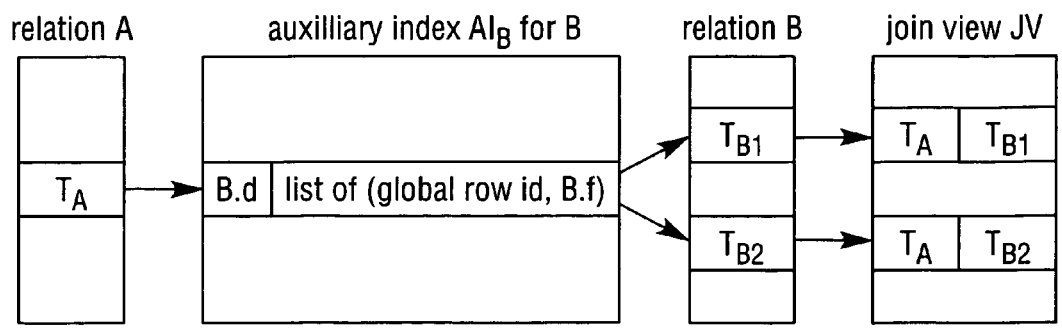
FIG. 18 illustrates join view maintenance using auxiliary indices and the no-lock locking mechanism.

Join view maintenance can be implemented using the distributed locking mechanism in a parallel database system. Consider a join view Jv=A⋈B based on the join condition A.c=B.d. Suppose neither A nor B is partitioned on the join attribute, and suppose A.e (B.f) is the value locking attribute of A (B). In this case, two auxiliary indices $AI_A$ and $AI_B$ are created, with $AI_B$ shown in FIG. 18. Auxiliary index $AI_A$, which is partitioned on A.c, is an index on the join attribute A.c. Each entry of the auxiliary index $AI_A$ is of the form (value of A.c, list of two-tuples (global row identifier, value of A.e)). Note that this implementation of each auxiliary index differs slightly from that described above. The list of two-tuples contains all the global row identifiers (with associated A.e values) of the tuples of relation A whose attribute A.c is of that value. The same technique is applied to base relation B. Table-level S, X, IS, and IX locks are allowed on A, B, $AI_A$, and $AI_B$. S or X value locks are allowed on A for A.e, on B for B.f, on $AI_A$ for A.c, and on $AI_B$ for B.d. Note that, in this embodiment, locks are placed on auxiliary indices.

When a tuple $T_A$ is inserted into base relation A, the following operations are performed to maintain the join view JV using the no-lock locking mechanisms for JV. First, an IX lock is placed on A and an X value lock is placed on a $T_A$.e value for A. The tuple $T_A$ is then inserted into the base relation A. Next, an IX lock is placed on $AI_A$ and an X value lock is placed on $T_A.C$ for $AI_A$. The data structure ($T_A.C$, (global row identifier of $T_A$, $T_A.e$)) is then inserted into the auxiliary index $AI_A$.

Next, an IS lock is placed on the auxiliary index $AI_B$ and an S value lock is placed on $T_A.C$ for the auxiliary index $AI_B$. The data server module next finds the entry in the auxiliary index $AI_B$ according to $T_A.C$. Next, the data server module finds all the two-tuples (global row identifier of $T_B$, value of $T_B.f$) for those tuples $T_B$ of base relation B that match with $T_A$. For each two-tuple (global row identifier of TB, value of $T_B.f$), an IS lock is placed on the base relation B and an S value lock is placed on $T_B.f$ for the base relation B.

The join of tuples $T_A$ and $T_B$ is then performed, with the join result tuple inserted into the join view JV.

A benefit of the join view maintenance mechanism described above is that no table-level S or X locks are placed on A, B, or JV for join view maintenance. Only IX or IS locks and X or S value locks on A, B, $AI_A$, and $AI_B$ are needed while they are distributed among all the nodes. Thus, no centralized node will become a bottleneck and many transactions can be executed concurrently in a parallel database system where each transaction updates one or several base relations of a join view.

IX. System Environment

Instructions of the various software routines or modules discussed herein (such as the data server modules, lock managers, and so forth) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A database system comprising:
   a storage to store plural base relations and a materialized view based on the plural base relations; and
   a controller adapted to provide plural types of locks to maintain data consistency in the base relations and the view, the plural types of locks comprising a shared lock and an exclusive lock for the base relations and a name lock for the view,
   the name lock to specify a name of one of the base relations being updated that causes an update of the view, and block placement of any one of a subsequent shared lock and exclusive lock on the view,
      wherein the controller is further adapted to place the name lock on the view in response to a transaction to update the one base relation and,
      while the name lock is active, allow placement of a subsequent name lock on the view if the subsequent name lock is for another transaction that also updates the one base relation.

2. The database system of claim 1, the name lock to further specify a number of transactions updating the view through updating the one base relation.

3. The database system of claim 2, wherein the name lock includes a count parameter to specify the number of transactions, the controller to vary a value of the count parameter in response to the transactions starting and completing.

4. The database system of claim 1, wherein the name lock is a form of exclusive lock, the name lock conflicting with either a shared lock or exclusive lock but not conflicting with another name lock specifying the one base relation.

5. The database system of claim 1, wherein the controller is adapted to place a first name lock on the view in response to a first transaction that updates the view through updating the one base relation.

6. The database system of claim 5, wherein the controller is adapted to place a second name lock that is concurrently active with the first name lock on the view in response to a second transaction that updates the view through updating the one base relation.

7. The database system of claim 6, wherein the name lock includes a count parameter to specify the number of transactions, the controller adapted to set the count parameter to a value of two to indicate placement of the first and second name locks.

8. The database system of claim 6, wherein the controller is adapted to place a shared lock on the view in response to a third transaction that reads the view.

9. The database system of claim 8, wherein the controller is adapted to place an exclusive lock on the view in response to a fourth transaction that updates plural base transactions of the view.

10. The database system of claim 8, wherein the controller is adapted to place an exclusive lock on the view in response to a fourth transaction that both reads the view and updates the view through an update of a base relation of the view.

11. The database system of claim 1, wherein the storage comprises plural storage modules, each of the base relations and view partitioned across the plural storage modules,
   wherein the controller comprises plural data server modules to manage access of data in the storage modules.

12. The database system of claim 11, the data server modules to concurrently perform plural updates of one of the base relations, and to concurrently place a name lock on the view for each of the updates.

13. The database system of claim 1, wherein the view comprises one of a join view and aggregate join view.

14. An article comprising at least one storage medium containing instructions that when executed cause a database system to:
- store plural base relations and a materialized view based on the base relations;
- receive a first transaction to update a first one of the base relations; and
- place a name lock on the view in response to the first transaction if the name lock does not conflict with any lock already placed on the view, wherein the name lock
  (i) identifies the first base relation that is being updated,
  (ii) blocks placement of any one of a subsequent shared lock and exclusive lock on the view, and
  (iii) while the name lock is active, allows placement of a subsequent name lock on the view if the subsequent name lock is for another transaction that also updates the first one of the base relations.

15. The article of claim 14, wherein the instructions when executed cause the database system to increment a count parameter in the name lock for the first transaction,
the count parameter indicating a number of transactions that update the view through updating the first base relation.

16. The article of claim 15, wherein the instructions when executed cause the database system to:
- receive a second transaction to update the one base relation; and
- further increment the count parameter for the second transaction to indicate placement of another name lock on the view.

17. The article of claim 14, wherein the instructions when executed cause the database system to check that a shared lock or an exclusive lock has not already been placed on the view,
the shared lock or exclusive lock conflicting with the name lock.

18. The article of claim 14, wherein the instructions when executed cause the database system to further:
- receive a second transaction to read the view; and
- place a shared lock on the view for the second transaction if a name lock or exclusive lock has not already been placed on the view.

19. The article of claim 18, wherein the instructions when executed cause the database system to further:
- receive a third transaction to update plural base relations; and
- place an exclusive lock on the view for the third transaction if none of the shared lock, exclusive lock, and name lock has been placed on the view.

20. The article of claim 18, wherein the instructions when executed cause the database system to further:
- receive a third transaction to both update and read a view; and
- place an exclusive lock on the view for the third transaction if none of a shared lock, exclusive lock, and name lock has been placed on the view.

21. The article of claim 14, wherein the database system has plural storage modules across which each of the base relations and view is partitioned, wherein the instructions when executed cause the database system to:
- receive a second transaction to update the first base relation;
- place a further name lock on the view; and
- perform the updates of the first and second transactions concurrently on different partitions of the first base relation.

22. The article of claim 21, wherein the instructions when executed cause the database system to:
place the plural name locks on the view by updating a name-lock data structure containing a parameter indicating a number of transactions updating the first base relation.

23. A method of maintaining data consistency in a database system storing base relations and a materialized view based on the base relations, comprising:
- receiving a first transaction requesting an update of a first base relation of the view; and
- if no conflicting locks have been placed on the view, placing a name lock on the view, wherein the name lock
  (i) identifying the first base relation,
  (ii) blocking placement of any one of a subsequent shared lock and exclusive lock on the view, and
  (iii) while the name lock is active, allowing placement of a subsequent name lock on the view if the subsequent name lock is for another transaction that also updates the first base relation.

24. The method of claim 23, wherein placing the name lock comprises placing a name lock that is associated with a data structure, the data structure comprising a first element to identify the first base relation, and a second element to indicate a number of transactions updating the first base relation.

25. The method of claim 24, further comprising:
- receiving a second transaction requesting an update of a second base relation of the view; and
- blocking the second transaction due to a conflict between a lock required for the update in the second transaction and the name lock on the view for the first transaction.

26. The method of claim 25, further comprising:
- receiving a third transaction requesting an update of the first base relation of the view;
- allowing the third transaction to proceed; and
- placing another name lock on the view for the third transaction.

27. The method of claim 23, wherein the database system comprises plural storage modules across which each of the base relations and view is partitioned, the method further comprising:
- storing auxiliary relations corresponding to the base relations, each auxiliary relation containing at least a portion of a corresponding base relation but partitioned across the storage modules differently from the base relation; and
- in response to updating the first base relation, place a lock on the first base relation without placing a lock on a corresponding auxiliary relation.

28. The method of claim 27, wherein the database system comprises plural storage modules across which each of the base relations and view is partitioned, the method further comprising:
- storing auxiliary indices corresponding to the base relations, each auxiliary index containing a join attribute of a corresponding base relation, the auxiliary index further identifying locations of tuples in the corresponding base relation containing a given join attribute value; and
- in response to updating the first base relation, place a lock on the first base relation without placing a lock on a corresponding auxiliary index.

* * * * *